US012809936B2

(12) United States Patent
Baker et al.

(10) Patent No.: US 12,809,936 B2
(45) Date of Patent: Nov. 24, 2026

(54) COMPUTER-IMPLEMENTED METHOD OF SOLVING A HAMILTONIAN

(71) Applicant: SOCPRA SCIENCES ET GENIE S.E.C., Sherbrooke (CA)

(72) Inventors: Thomas E. Baker, Sherbrooke (CA); Alexandre Premont-Foley, Sherbrooke (CA); Agustin Di Paolo, Sherbrooke (CA); David Senechal, Sherbrooke (CA)

(73) Assignee: SOCPRA SCIENCES ET GENIE S.E.C., Sherbrooke (CA)

( * ) Notice: Subject to any disclaimer, the term of this patent is extended or adjusted under 35 U.S.C. 154(b) by 1210 days.

(21) Appl. No.: 17/781,768

(22) PCT Filed: Dec. 2, 2020

(86) PCT No.: PCT/CA2020/051647
§ 371 (c)(1),
(2) Date: Jun. 2, 2022

(87) PCT Pub. No.: WO2021/108902
PCT Pub. Date: Jun. 10, 2021

(65) Prior Publication Data

US 2023/0040584 A1 Feb. 9, 2023

Related U.S. Application Data

(60) Provisional application No. 62/942,868, filed on Dec. 3, 2019.

(51) Int. Cl.
*G06F 17/16* (2006.01)
*G06N 10/20* (2022.01)

(52) U.S. Cl.
CPC ............. *G06F 17/16* (2013.01); *G06N 10/20* (2022.01)

(58) Field of Classification Search
CPC .......... G06F 17/16; G06F 17/11; G06N 10/20
See application file for complete search history.

(56) References Cited

U.S. PATENT DOCUMENTS

| | | | | |
|---|---|---|---|---|
| 9,600,896 | B1 * | 3/2017 | Mansour | G06T 7/20 |
| 2010/0317420 | A1 * | 12/2010 | Hoffberg | G06Q 30/0282 463/1 |
| 2017/0219636 | A1 * | 8/2017 | Wang | G01R 31/31702 |

FOREIGN PATENT DOCUMENTS

| | | | | |
|---|---|---|---|---|
| CA | 3093230 A1 * | 10/2019 | | G06N 10/20 |
| CN | 103886165 B * | 9/2016 | | |

(Continued)

OTHER PUBLICATIONS

Baker et al., “Basic Tensor NetworkComputaflons in Physics”. arXiv, Nov. 7, 2019 (Nov. 7, 2019), [online] [retrieved on Feb. 1, 2021 (Feb. 1, 2021)]. Retrieved from the Internet: https://arxiv.org/abs/1911.11566.pdf.

(Continued)

*Primary Examiner* — Christopher D Birkhimer
(74) *Attorney, Agent, or Firm* — Norton Rose Fulbright Canada LLP; Alexandre Daoust

(57) ABSTRACT

The computer implemented method of solving a Hamiltonian can include performing, in a tensor network contracting a plurality of tensors in the network, a Lanczos method acting on the uncontracted tensors, the Lanczos method including evaluating a recursive relation of an equation including using the equation at least two times, forming a block tridiagonal matrix having a block size greater than one, based on the recursive relation, and diagonalizing the block tridiagonal matrix to obtain new tensors and energy levels of the tensor network, wherein at least one of the uncontracted tensors of the network has an index for the group of excitations; and solving for the rest of the tensor (Continued)

network, yielding an energy level solution of the Hamiltonian, outputting the energy level solution.

20 Claims, 22 Drawing Sheets

(56) References Cited

FOREIGN PATENT DOCUMENTS

| | | | | | |
|---|---|---|---|---|---|
| JP | 2019531008 | A | * | 10/2019 | G06F 30/392 |
| WO | WO-2018220368 | A1 | * | 12/2018 | G06N 3/088 |
| WO | WO-2019023500 | A1 | * | 1/2019 | G05B 13/027 |

OTHER PUBLICATIONS

Huang. et al., “A generalized Lanczos method for systematic Optimization o/Tensor Network States”. arXiv, Nov. 29, 2016 (Nov. 29, 2016), vol. 27, [online] [retrieved on Feb. 1, 2021 (Feb. 1, 2021)]. Retrieved from the Internet: https://arxiv.org/pdf/1611.09574.pdf.

* cited by examiner

COMPUTER-IMPLEMENTED METHOD OF SOLVING A HAMILTONIAN

FIELD

The specification relates to a computer-implemented method of solving a Hamiltonian, and more specifically to a tensor network approach which can be used to simulate the behavior of a superconductor-based quantum computer, for instance.

BACKGROUND

Many technological problems which society faces today rely on the diagonalization of a Hamiltonian, often expressible as a Hermitian matrix of relatively large sizes. This is the case, for instance, in the simulation of quantum computer designs based on superconducting circuits, simulation of many-body effects via N-point correlation functions, resonant inelastic X-ray spectra, quantum chemistry, topological phases, etc.

Known methods of solving a Hamiltonian, and especially Hamiltonians for large systems, rely entirely on the usage of a computer, given the complexity due to the exponentially large size of the computer memory needed for setting up solving the problem and the large number of calculations required. Such methods can require a significant amount of computer resources, such as computing time, even with powerful computers, and in some cases, the methods face serious converge issues, posing a practical limit to the ability of solving Hamiltonians with existing computer resources and techniques. For instance, to meet many of the demands of the projects on the superconducting-qubit and Dynamical Mean Field Theory, networks of computer clusters having supercomputer capabilities, such as the large computers associated with Compute Canada and Calcul Québec, need to be used. In some less exhaustive cases, personal computers can be used for testing superconducting-qubit systems, such as computers having 20-28 physical cores with about 3 GHz processors and a few hundred Gbs (may be 200-300) of RAM. Supercomputing resources may need to be used for memory concerns in the code, for instance. Increasing the speed at which the Hamiltonian can be solved using a computer is thus a significant need, because solving Hamiltonians faster and more efficiently could allow to solve larger physical systems and obtain more information, and facilitate the appearance of technological breakthroughs in several fields of technology, in a day and age where technological breakthroughs are becoming more and more necessary to obtain.

Computerized methods known as tensor networks are known to potentially allow for solving large systems by discarding the least relevant degrees of freedom systematically. Using a tensor network, a large system can be re-expressed with only a few sites at a time, allowing for an algorithm to address the problem systematically site-by-site, using a finite amount of computer resources. Several tensor network methods exist, but not all tensor network methods are appropriate for all problems. Reliability of the method and number of sites practically addressable, and the type of problem which can be addressed with the method, are important considerations in the choice of a method for a particular problem.

Indeed, some existing techniques can produce discrepancies or systematic errors such as missing eigenvalues, which can lead to not retaining that method as a suitable method for a specific problem. Although known techniques were satisfactory to a certain degree, there remains room for improvement.

For instance, some technological problems required to solve for more than one eigenvalue. To solve for more than one eigenvalue with density matrix renormalization group (DMRG), for instance, the method needed to be repeated for the different eigenvalues, significantly increasing the amount of computing time required.

SUMMARY

There is provided a computerized method of solving a Hamiltonian allowing to address a large system (e.g. a system having more than 5 sites, more than 20 sites, even more than 50 sites), and wherein a plurality of eigenvalues, and potentially a large number of eigenvalues, such as more than 10, more than 100, or even more than 1000, can be addressed simultaneously. Such a computerized method can allow a significant efficiency gain, for instance, compared to repeating traditional DMRG for a plurality of eigenvalues.

The Density Matrix Renormalization Group (DMRG) is perhaps the most popular tensor network method. The steps in a DMRG algorithm involve formulating the quantum problem in terms of a set of local tensors. The Hamiltonian is decomposed into a matrix product operator (MPO) and the state is represented as a matrix product state (MPS). DMRG provides an approximation of the solution, which is satisfactory in many applications where it is considered acceptable to solve the problem to within a given tolerance.

Such a computerized method can be used for various applications. One possible application is simulating circuit elements for a quantum computing based on superconducting circuits, for instance. Indeed, the process of building a quantum computer can be compared to the process of building an aircraft, for instance. Before producing an aircraft, several versions of components of the aircraft are simulated, with one version being ultimately retained and the others discarded. The choice of the version retained can be affected by different factors. Building the component and testing it in simulated conditions of use is one possible source of validation, but this is very resource intensive. In many cases, it is preferable to conduct computerized simulations to validate whether the version of the component in question appears to lead to the desired behavior (structure, aerodynamics, etc), and computerized simulations conducted on several versions prior to testing an actual prototype can allow a research group to save a significant amount of money. Similarly, building an actual prototype of a quantum computer can be extremely costly, and it can be desired to obtain as much information possible about the actual behavior of the quantum computer design before actually building and testing one. If the results of the simulation are positive, then one can go on to actually build a prototype device. If the results of the simulation are negative, one will typically have saved resources by discovering this at the stage of simulation rather than subsequently to have built it. Similarly, simulating changes to an existing quantum computer design can potentially allow one to validate whether such changes can actually lead to the desired results or not. The behavior of quantum computer designs based on superconducting circuits can be simulated based on solving a Hamiltonian, and so a computer resource-efficient method of solving a Hamiltonian can be useful to this end, amongst several other examples.

In accordance with one aspect, it was found that a tensor network method of solving a Hamiltonian could be adapted to solving several eigenvalues, such as several excitations, simultaneously. This can involve providing an extra index for identifying the several eigenvalues to at least one tensor of the network. Other tensors of the network can be contracted, and a solution including new eigenvectors and the new eigenvalues can be obtained 108 simultaneously for the different eigenvalues by i) evaluating a recursive relation 101, ii) forming a block tridiagonal matrix 102 on the basis of the recursive relation, and iii) diagonalizing it 103.

There are different approaches to extending the solution to the rest of the tensor network 104. In a Lanczos approach, for instance, the orthogonality center can be moved on to the next site 105, and the steps i) to iii) 101, 102, 103 can be repeated for the next site, and so on, for a given number of "sweeps" of the network, or until the eigenvalues are determined to have stopped changing within a desired tolerance 106, for instance. The tensor network ansatz can be for DMRG, for instance, in which case the tensors can be provided in the form of a bundled MPS 107. In alternate embodiments, the same concept may potentially be applied to other tensor network ansatz, such as PEPS (projected entanglement pair states—claimed to have an orthogonality center) or MERA (in which only some of the tensors are affected by changes) for instance, with the additional index added to at least one of the tensors to cover a plurality of eigenvalues. Another expansion in Krylov subspace can be used in such embodiments. Alternately, regular Lanczos can be used instead of block Lanczos, such as by using MPS, taking the tensor with extra index, pulling out one MPS from it at the time, put it into regular Lanczos, run for a couple of iterations, and return the results back into the MPS. This process may appear less efficient and may lead to issues caused by numerical degeneracy which may exist in MPS, but this may nonetheless be considered suitable in some embodiments. Alternately, the rest of the tensor network can be solved without moving the orthogonality center, such as by using Conjugate gradient techniques with the resulting generalized eigenvalue problem (and, for example, optimizing over a Stiefold manifold) for instance.

Generally, solving for the new eigenvalues simultaneously involves forming an equation in the form $f(\Psi_{p+1}, B_{p+1})=$ , $\Psi_p, \Psi_{p-1}, \ldots, \Psi_1, \Psi_0, B_p, B_{p-1}, \ldots, B_1$), where $\mathbb{L}(\mathcal{H}$ $f$ is a function of the arg𝕃ments shown and is a recursive equation of the arguments shown. Ψ is the wavefunction and B represents an overlap between wavefunctions as an extension of the beta coefficients in traditional Lanczos. The equation can be formulated as $W_{p+1}B_{p+1}=\mathcal{H}\Psi_p-\Psi_pA_p-\Psi_{p-1}B_p$, for instance, where $A_p=\langle\Psi_p|\mathcal{H}|\Psi_p\rangle/\langle\Psi_p|\Psi_p\rangle$. The equation can be used to form a block tridiagonal $$\breve{M}=\begin{pmatrix} A_0 & B_1^\dagger & 0 & \ldots & 0 \\ B_1 & A_1 & B_2^\dagger & \ldots & 0 \\ 0 & B_2 & A_2 & \ddots & \vdots \\ \vdots & \vdots & \ddots & \ddots & B_n^\dagger \\ 0 & 0 & \ldots & B_n & A_n \end{pmatrix}$$

where $p\in\{0, n\}$ and the algorithm is run for n−1 times. The matrix can then be diagonalized to solve the eigenvalues simultaneously. This can be generally referred to as addressing a Sturm-Liouville problem. $B_{p+1}$ can be a matrix that results from a decompositi𝕃n of the result of and where and $B_0=0$. The method can be performed on the basis of a tensor network having a plurality of contracted tensors, and at least one non-contracted tensor j, tensor j having the additional index covering the plurality of excitations. $\Psi_1$ can be obtained from a decomposition of tensor j, and $A_p=\langle\Psi_p|\mathcal{H}|\Psi_p\rangle$ is perhaps not the most general way of presenting the matrix, the normalized form $A_p=\langle\Psi_p|\mathcal{H}|\Psi_p\rangle/\langle\Psi_p|\Psi_p\rangle$; is possibly more general $$\Psi_p^\dagger.$$

$\Psi_p$ is typically 1 in Lanczos algorithms, but may have another value in other embodiments. The recursive relationship for $\{A_p\}$ and $\{B_p\}$ can be determined, and the matrix can be formed on that basis.

DMRG is known to perform well with low-lying excitations, which is suitable for addressing problems such as the one posed in the simulation of a superconducting circuit for instance. A shift inverse method can be used to extend the reliability of DMRG to higher excitations, and potentially to cover any one of a finite number of eigenvalues in a spectrum. One will input a set of numbers, by using the method, find excitations with energies closest to those numbers. Shift inverse method in DMRG involves minimizing over Hamiltonian $\mathcal{H}-\alpha$ instead of Hamiltonian $\mathcal{H}$.

Some embodiments may require orthogonality whereas other embodiments may not require orthogonality. In this specification, "diagonalize" is used to encompass, for instance, the use of a generalized eigenvalue decomposition instead of a regular eigenvalue decomposition. If a condition for orthonormality (orthogonal and normalized) of the excitation is present, it can be expressed as $$\Psi_k^\dagger\cdot\Psi_\ell=\delta_{k,\ell}\cdot\hat{I},$$

where Î is the identity matrix and $\delta_{k,\ell}$ is a Kronecker delta function. This constraint can define the way in which $B_p$ can be computed. Non-orthogonality can usually be converted back into orthogonal basis under the same conditions as solving a generalized eigenvalue problem.

In the context of Lanczos-based approaches, the same bundled MPS configuration can be used and lead to Block Lanczos or Banded Lanczos for instance, on the basis of whether SVD or QR is used to obtain the elements used to build the equation $\Psi_{p+1}B_{p+1}=\mathcal{H}\Psi_p-\Psi_pA_p-\Psi_{p-1}B_p$. The approach can be performed on one site at a time, two sites at a time, or more than two sites at a time. In an embodiment presented below, the single-site approach was found to lead to greater computing efficiency, but the two site, or greater site approach may be preferable, or otherwise suitable, in other embodiments. Instead of contracting the full tensor network at each iteration 113 (i.e. at each time the orthogonality center is moved 105), a quick update where only outlying tensors are updated can be used to gain processing efficiency. In alternate embodiments, a full update can be performed at each iteration, or in some specific iterations, and other approaches can be used.

In accordance with one aspect, there is provided a computer implemented method of solving a Hamiltonian 119 for a plurality of excitations, the method comprising: performing, in a tensor network contracting a plurality of tensors in the network 109, a Lanczos method acting on the uncontracted tensors 101, the Lanczos method including evaluating a recursive relation of an equation including using the equation at least two times, forming a block tridiagonal matrix having a block size greater than one 102, based on the recursive relation, and diagonalizing the block tridiagonal matrix to obtain new tensors and energy levels of the tensor network 103, wherein at least one of the uncontracted tensors of the network has an index for the group of excitations; and solving for the rest of the tensor network 104, thereby solving the Hamiltonian 108.

In accordance with another aspect, there is provided a method of solving a Hamiltonian 11, the method comprising: forming an equation of the form $f(\Psi_{p+1},B_{p+1})=\mathbb{L}(\mathcal{H}, \Psi_p, \Psi_{p-1}, \ldots, \Psi_1, \Psi_0, B_p, B_{p-1}, \ldots, B_1)$, where $B_{p+1}$ is a matrix that results from a decomposition of the result of L and where $p\in\{0, \ldots, n\}$, on the basis of a tensor network having a plurality of contracted tensors, and at least one non-contracted tensor j, tensor j having an additional index covering a plurality of excitations, including obtaining $\Psi_0$, from a decomposition of tensor j, and $A_p$ in the form of a matrix $A_p = \langle\Psi_p|\mathcal{H}|\Psi_p\rangle / \langle\Psi_p|\Psi_p\rangle$ 13; evaluating a recursive relation for $\{A_p\}$ and $\{B_p\}$ including using the formed equation at least two times 15; using $\{A_p\}$ and $\{B_p\}$ to form a block tridiagonal $\breve{M}$, where $$\breve{M} = \begin{pmatrix} A_0 & B_1^\dagger & 0 & \ldots & 0 \\ B_1 & A_1 & B_2^\dagger & \ldots & 0 \\ 0 & B_2 & A_2 & \ddots & \vdots \\ \vdots & \vdots & \ddots & \ddots & B_n^\dagger \\ 0 & 0 & \ldots & B_n & A_n \end{pmatrix}$$

and where the recursive relation was evaluated n−1 times 16; diagonalizing the matrix to obtain new tensors and energy levels of the tensor network 17; and solving the other tensors of the tensor network 18, thereby solving the Hamiltonian 18.

The methods presented above can be referred to as a core algorithm, and can begin by receiving the contracted network. However, in some embodiments, it can be preferred to make the computer software more user-friendly, and to provide additional functionality to allow the user to provide directly the Hamiltonian, and for the software to convert this Hamiltonian into a MPO. Additional possible functionalities which can be provided alone or in any combination are the functionality of forming the bundled MPS, and contracting the tensors of the network. For instance, in a commercial application, the core algorithm, the algorithm forming the MPO from the Hamiltonian, the algorithm providing the bundled MPS, and the algorithm contracting the tensors of the network can be provided by the same, or by different service providers.

It will be understood that the expression "computer" as used herein is not to be interpreted in a limiting manner. It is rather used in a broad sense to generally refer to the combination of some form of one or more processing units and some form of non-transitory memory system accessible by the processing unit(s). The memory system can be of the non-transitory type. The use of the expression "computer" in its singular form as used herein includes within its scope the combination of a two or more computers working collaboratively to perform a given function. Moreover, the expression "computer" as used herein includes within its scope the use of partial capacities of a processing unit of an elaborate computing system also adapted to perform other functions.

A processing unit 230 can be embodied in the form of a general-purpose micro-processor or microcontroller, a digital signal processing (DSP) processor, an integrated circuit, a field programmable gate array (FPGA), a reconfigurable processor, a programmable read-only memory (PROM), to name a few examples.

The memory system 232 can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer 238 can have one or more input/output (I/O) interface 236 to allow communication with a human user and/or with another computer via an associated input, output, or input/output device such as a keybord, a mouse, a touchscreen, an antenna, a port, etc. Each I/O interface 236 can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that the various functions of a computer can be performed by hardware or by a combination of both hardware and software. For example, hardware can include logic gates included as part of a silicon chip of the processor. Software (e.g. application, process) can be in the form of data such as computer-readable instructions 234 stored in the memory system 232. With respect to a computer, the expression "configured to" relates to the presence of hardware or a combination of hardware and software which is operable to perform the associated functions.

In one embodiment, the core algorithm can be provided in the form of software stored in a powerful computer at a processing site, and users can input computer readable data such as Hamiltonians, wavefunctions, bundled MPS, MPO, contracted network into the computer via any suitable data communication means, such as via the Internet for instance, or by connecting computer memory hardware having the data recorded thereon to the computer with a wired connection, for instance. The core algorithm can be processed at the processing site, and the core algorithm can output a solution, such as energy levels for instance 19. The solution can be stored into the computer's memory, and/or transmitted to the computer memory hardware such as via a wired or wireless connection, such as via the Internet for instance.

The core algorithm can be used for various potential applications. Such applications can include the simulation of large-scale superconducting qubit devices, continued fractions, quantum chemistry, topological phases, etc. For example, known electronic structure codes such as Gaussian, Turbomol, or Wien-2k. Other applications are possible, for example, excitations are necessary for resonant inelastic x-ray spectra (RIXS)—which has been treated by DMRG methods.

Many further features and combinations thereof concerning the present improvements will appear to those skilled in the art following a reading of the instant disclosure.

DESCRIPTION OF THE FIGURES

In the figures,

FIG. 12 is a diagram illustrating contraction order used for the single site representation. The left environment is contracted onto the MPO. The right environment is contracted onto the bundled orthogonality center. The last step is to take the two tensors and contract common indices. In each step, tensors are contracted pairwise with the left and right given in the figure. This order automatically places the indices in the same order as the input orthogonality center and avoids an extra permutation;

FIG. 21 is a graph showing the frequency spectrum of a 20 coupled fluxonia chain including a total of 60 excitations as a function of the external flux;

DETAILED DESCRIPTION

A first possible embodiment of a method for solving a Hamiltonian using a tensor network will now be presented for the purpose of illustration.

Figure 1:
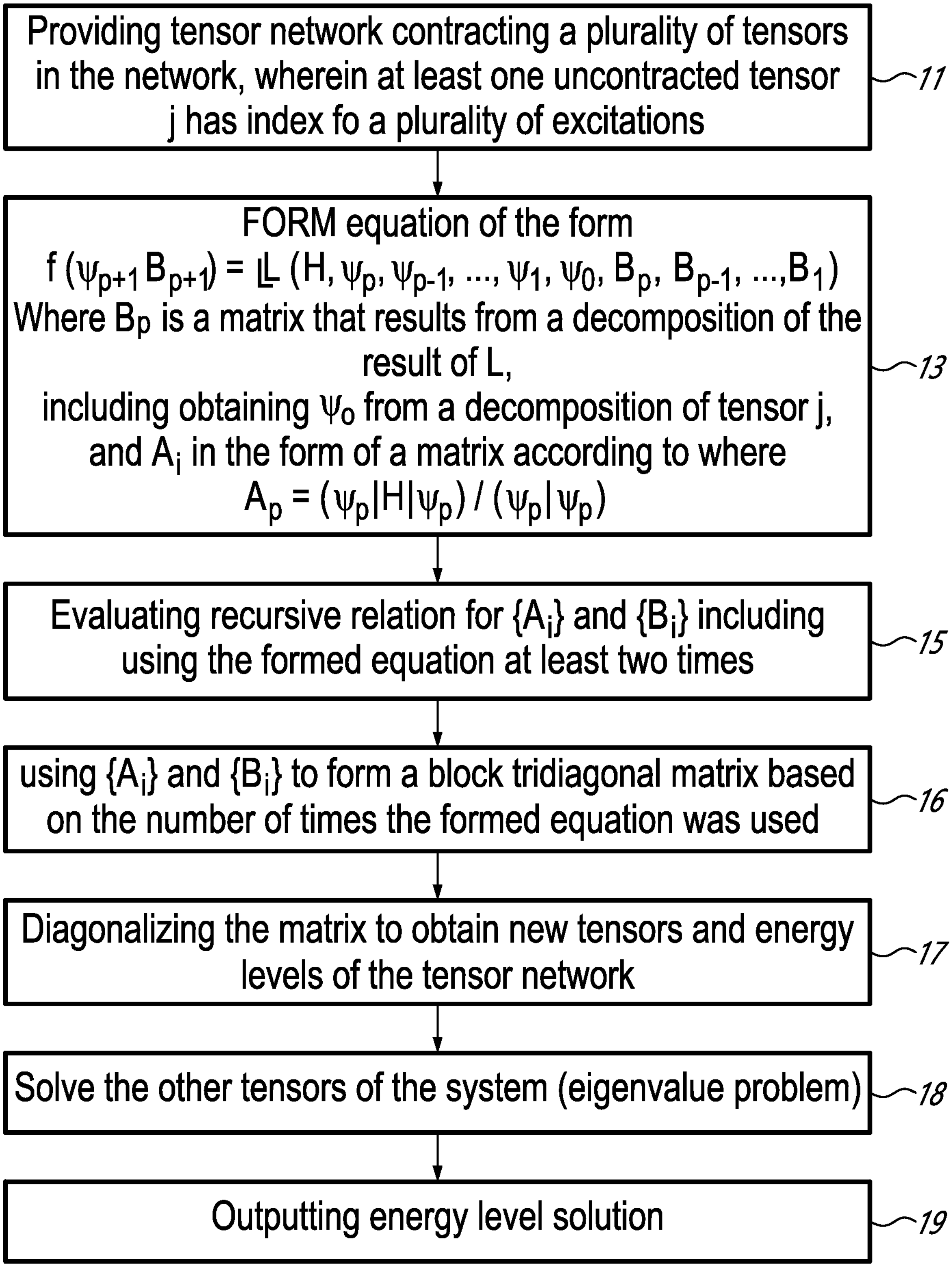
FIG. 1 is a flowchart of an embodiment of a method for solving a Hamiltonian applicable to a large system and where a plurality of excitations are addressed simultaneously.
Figure 2:
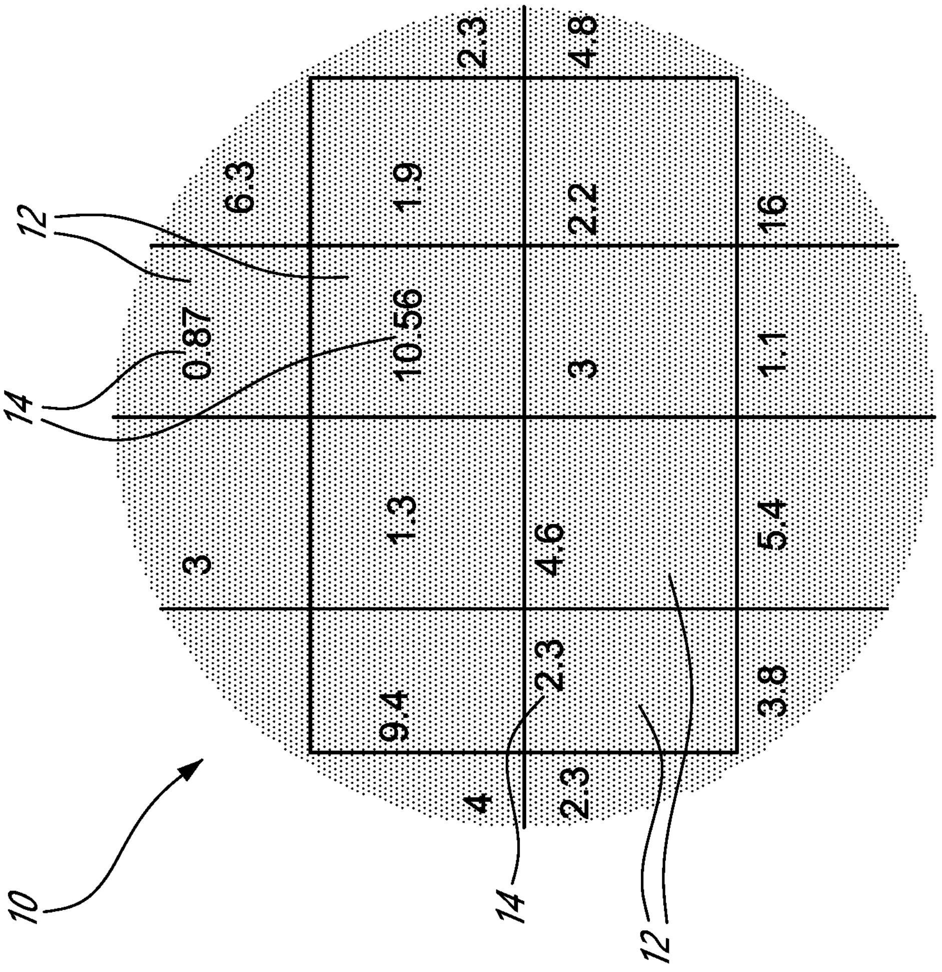
FIG. 2 is a schematic used to illustrate an example process of solving the Hamiltonian using Block Lanczos for expanding Krylov subspace.

To facilitate the understanding of the following explanation, the concept behind the tensor network can be vulgarized with a classical analogy:

Consider the ball 10 presented in FIG. 2 as a quantum system. Each section represents a different part of the system. In many cases of solving Hamiltonians, solving the entire system can typically be too expensive in terms of traditional computing power. This can take days or may never be solved over several years. One challenge arises from the fact is that the complexity of the system grows exponentially with the number of sites. The order of magnitude of the complexity scale can be such as $d^N$, where N is the number of sites and d the Hilbert-space dimension of each site. Representing such a problem, when N is large, can cause computer memory issues. A tensor network can allow addressing such a system in a manner which can scale proportionally to N, for instance.

To follow up on this example, let's choose only a few parts of the system to optimize at a time. For our example, each box 12 of the ball 10 has one number 14. We need to get the right numbers in the right box 12 in order to ensure we find the correct solution.

The solution strategy in a tensor network is to take two (or some other number) parts of a system, update the numbers inside each part, and then move to the next two sites. The system then converges to the correct set of numbers.

In a real quantum problem, the general picture is not too far off from the simplified one presented above, but there are a number of additional details, such as:

1) There's an operator that controls the numbers 14 in each box 12 (known as the matrix product operator (MPO));
2) Each box 12 is not controlled by a single number 14, instead it is controlled by many numbers that are stored in a tensor;
3) We want to compute many different sets of numbers in our application for many excited states, whereas the diagram presented in FIG. 2 represents only a single excitation. Many sets of numbers are stored in order for the algorithm to work, and the algorithm can be used to solve all excitations at once; and
4) In a tensor network, the other boxes 12 have an effect on the box(es) 12 that we intend to solve.

I—Example Embodiment Using Bundled MPS and Block Lanczos in Expansion of Krylov Subspace In practice, the density matrix renormalization group (DMRG) algorithm can be used in order to find the lowest lying excitations of a given lattice model. The algorithm can perform efficiently, requiring only modest resources above a DMRG algorithm for the ground state. A special form of matrix product state (MPS), which we will refer to as "bundled MPS", can be performed rigorously and allows to encode many excitations into the same tensor network. Block Lanczos, banded Lanczos or some other means can be used for solving simultaneously for more than one eigenvalue at the Krylov subspace expansion. The solutions can be well captured by the tensor network algorithm because they lie on the extremes of the eigenvalue spectrum, states which MPS methods are known to capture well. However, the eigenstates can be solved simultaneously without growing the size of the MPO operator, so the algorithm can converge fast even for many excitations.

The following example will present an overview of a DMRG algorithm for a single ground state.

In this example, DMRG can be written in terms of tensors that represent the MPS formulation with the equation:

$$|\psi\rangle = \sum_{\{\sigma_i\},\{a_i\}} A_{a_1}^{\sigma_1} A_{a_2 a_3}^{\sigma_2} \ldots A_{a_{N-2} a_{N-1}}^{\sigma_{N-1}} A_{a_{N-1}}^{\sigma_N} |\sigma_1 \sigma_2 \ldots \sigma_N\rangle \quad (1)$$

Each of the objects A is a tensor in the MPS. Each is a rank 2 or 3 tensor. Instead of writing the tensors as a complicated network, we can represent it as a diagram 22 such as FIG. 3, where each block 20 in the diagram 22 represents a tensor, each line 24 represents an index on that tensor. In the schematic, the color of the tensors can represent the gauge.

The gauge of a MPS can be left-normalized (written as U tensors from an SVD; see step 3), right-normalized (V), or mixed with both U, V, and D.

Figure 4:
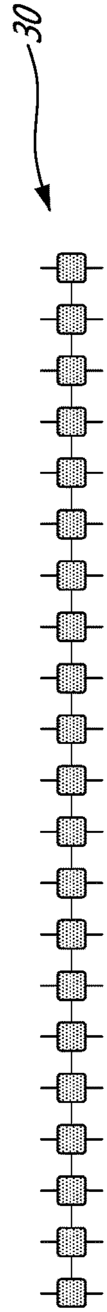
FIG. 4 is a block diagram schematizing a matrix product operator.
Figure 5:
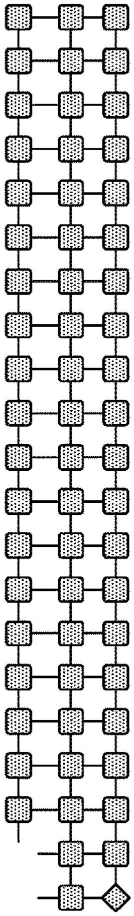
FIG. 5 is a block diagram schematizing the contraction of the system with the exception of two sites.
Figure 6:
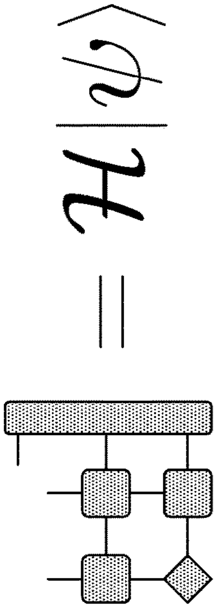
FIG. 6 is a dia$\mathcal{H}$am equivalent to $|\Psi\rangle$ showing uncontracted sites exposed, where all others were contracted into an environment tensor.

In addition to an MPS, we can also represent the Hamiltonian as a MPO as $$\mathcal{H} = \sum_{\{\sigma_j\},\{a_j\},\{\sigma_{j'}\}} H_{a_1}^{\sigma_1 \sigma_{1'}} H_{a_2}^{\sigma_2 \sigma_{2'}} \ldots H_{a_{N-2} a_{N-1}}^{\sigma_{n-1} \sigma_{N-1'}} H_{a_{N-1}}^{\sigma_n \sigma_{N'}} |\sigma_1 \sigma_2 \ldots \sigma_N\rangle \langle \sigma_{1'} \sigma_{2'} \ldots \sigma_{N'}| \quad (2)$$

which can be represented diagrammatically 30 as in FIG. 4.

A three step process can be repeated until the system is converged:

Step 1: Renormalization of the system

Figure 3:
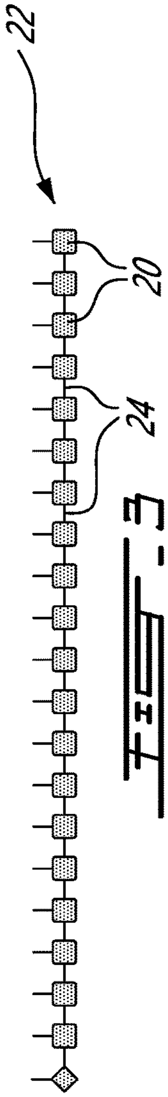
FIG. 3 is a block diagram schematizing a matrix product state with orthogonality center on the left-most site.

Taking both the MPS and MPO together, we can form the contraction of all sites of the system as in FIG. 2, with the exception of two sites. This is formally, $$\frac{\partial E}{\partial (B_1^* B_2^*)} = \frac{\partial \langle \psi | \mathcal{H} | \psi \rangle}{\partial (B_1^* B_2^*)} \quad (3)$$

and is equivalent to FIG. 3.

Once two (or however many sites we wish) are contracted, the numbers in those tensors are updated.

There are many ways to solve the eigenvalue problem. One strategy is to evaluate the entire eigenvalue problem, but this is often large and very inefficient. The other is to use a power method, but these tend to converge very slowly. We propose to use a Lanczos method specifically.

Step 2: Lanczos Method

The method we use, and that is known to be efficient, is the Lanczos method. The method is recursive taking the form $$|\Psi_{p+1}\rangle = \mathcal{H}|\Psi_p\rangle - \alpha_p|\Psi_p\rangle - \beta_p|\Psi_{p-1}\rangle \quad (4)$$

where $\alpha_p = \langle \Psi_p | \mathcal{H} | \Psi_p \rangle$ and $$\beta_p^2 = \langle \psi_{p-1} | \psi_{p-1} \rangle \quad (5)$$

and where $\beta_{p=0}=0$. The $\alpha_p$ coefficients are the eigenvalues and the $\beta_p$ coefficients are the overlap coefficients which can be used to determine convergence.

The algorithm can be run for only two rounds, for instance, since the environment tensor is not exact and we only want to update the tensors slightly. Running a full Lanczos, for instance, could result in over-correction for the given environment. Running two steps can also achieve greater speed.

Step 3: Singular Value Decomposition

Once the tensors are updated, a singular value decomposition (SVD) is applied. A SVD gives all the necessary components of a density matrix. We will skip a broader discussion of why this is important for the method here, but just comment that it is an effective strategy for the systems we study.

The singular value decomposition decomposes a tensor M into $$M = UDV^\dagger \quad (6)$$

where M was reshaped into a matrix and decomposed. The two tensors U and $V^\dagger$ are row-unitary, meaning that only they contract to the identity on one side generally, $U^\dagger U=1$ or $V^\dagger V=1$. The variety of SVD that we use (although one could trivially do this in a different way) is given a rectangular matrix M of size a×b, we find U to have sizes a×m, V of size m×b, and D of size m×m where m≤min(a, b). That is, the D matrix is square and can be truncated to limit the size of the tensor network.

The D matrix is the only non-unitary object in the network and the only tensor that holds weight. The rest constitute basis functions for D. Moving D onto the next site changes what is called the "center of orthogonality" in the system to the next site. We can then contract the network as we did in step 1, but on two (or other number) different sites. We repeat until the system is converged.

Figure 11:
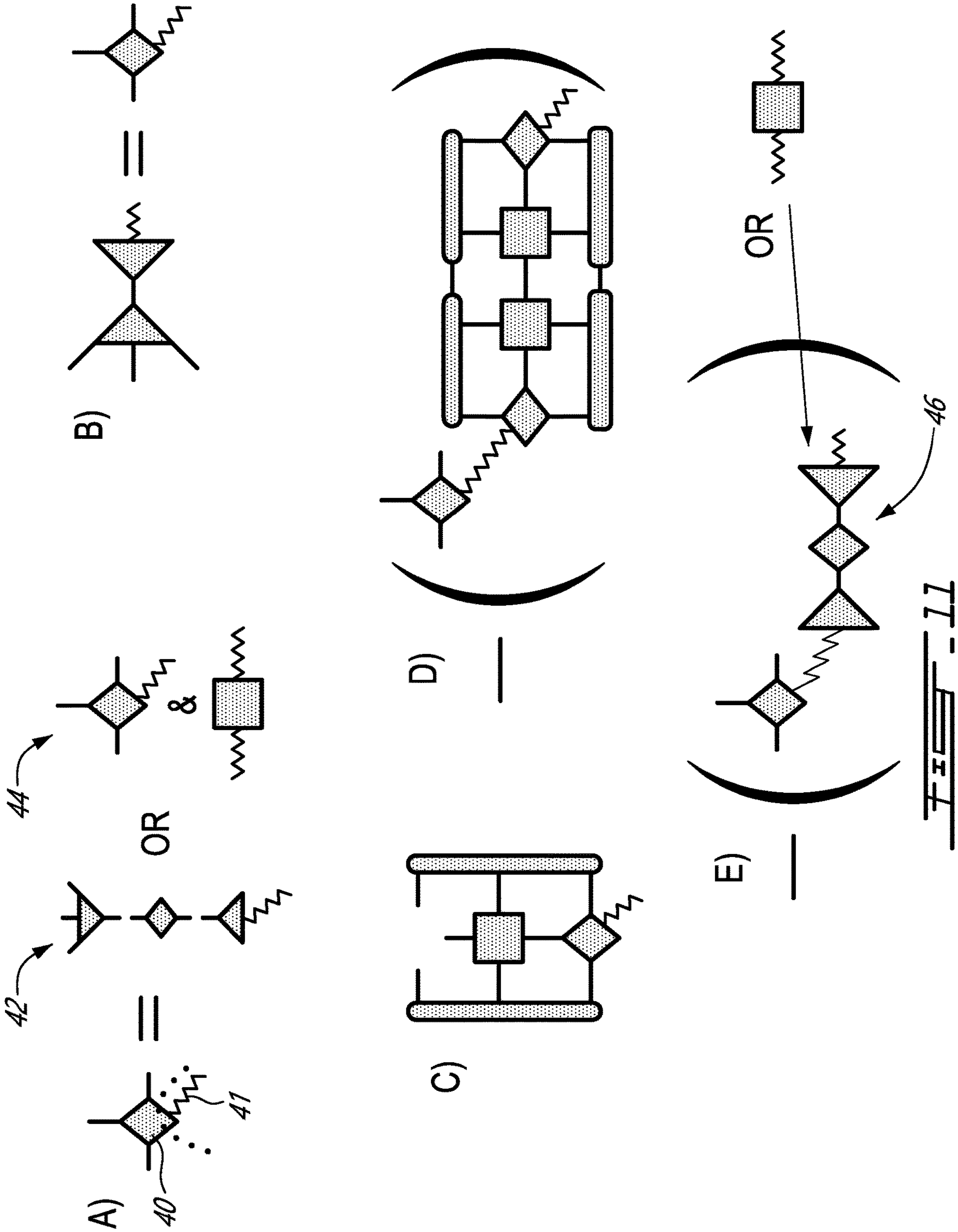
FIG. 11 is a diagram illustrating a Lanczos recursion relation for either Block Lanczos or Banded Lanczos.

SVD is represented schematically in FIG. 11. More specifically, the tensor 40 having the additional index 41 representative of excitations is presented on the left-hand side of A). SVD decomposes this tensor 40 into the term 42 immediately on the right-hand side of the equal sign of the equation, and can build the term 44 expressed at the left hand side of B) and the term 46 present in the right hand side of E) from the deconstructed components. When SVD is used, the Lanczos algorithm can be referred to as Block Lanczos. One of various possible alternatives to SVD is QR decomposition. QR decomposition immediately yields the elements 44 at the extreme right-hand side of A), which can directly be used in C, D and E. Technically, if QR decomposition is used instead of SVD decomposition, it may be more accurate to describe the Lanczos algorithm as Banded Lanczos. C), D) and E) represent the right-hand side elements of recursive equation (13) below, the use of which will be described in greater detail below.

A) Movement of Orthogonality Center

For clarity, we provide herewith diagrams that show the steps required to move the orthogonality center left (FIG. 7) or right (FIG. 8) for the regular or bundled MPS.

Figure 7:
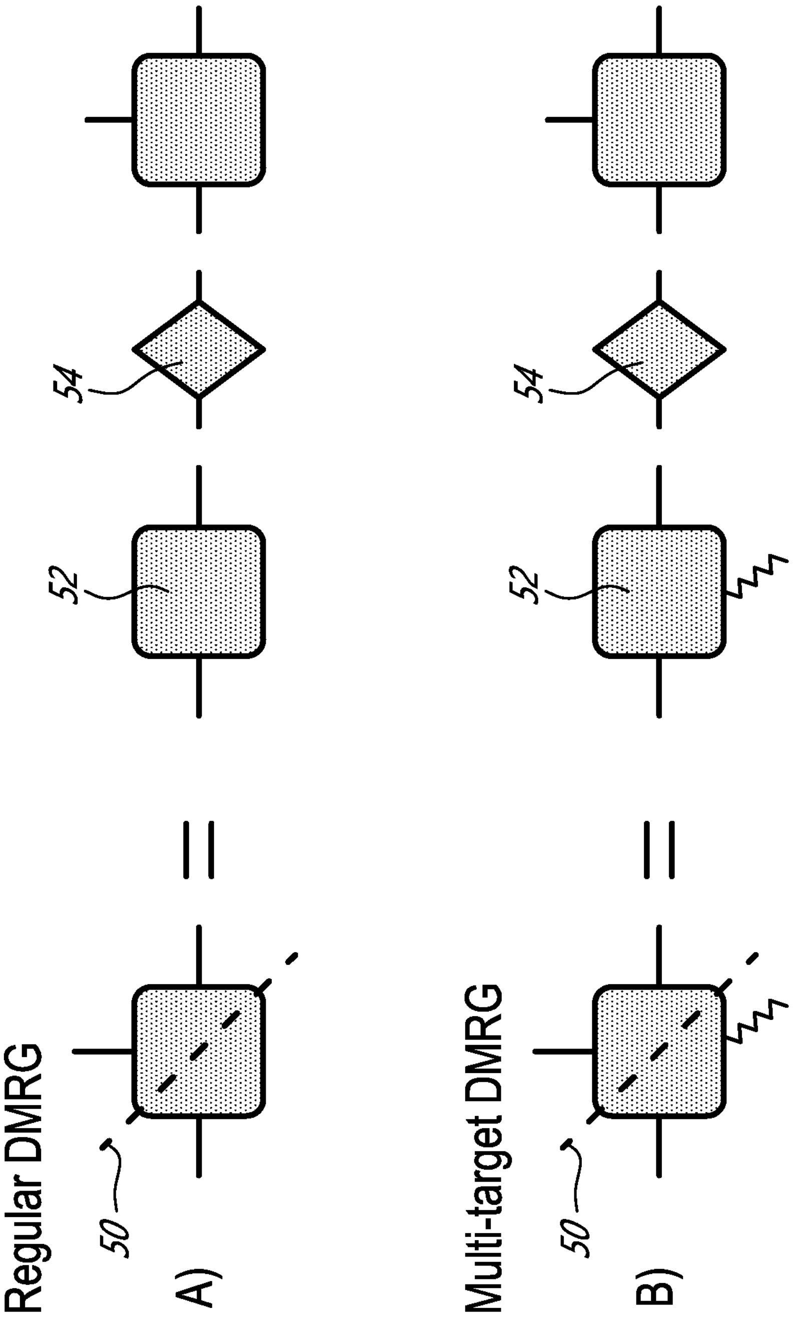
FIG. 7 is a diagram schematizing a move to the left for the orthogonality center on the MPS.

More specifically, in FIG. 7, a dashed line 50 represents how the indices are grouped on the MPS tensor. Those indices above and below form the two separate groups for the SVD.

The resulting yellow 52 and red diamond tensors 54 are contracted into the tensor to the left of the original site (not shown). This completes a move to the left for the orthogonality center on the MPS.

Figure 8:
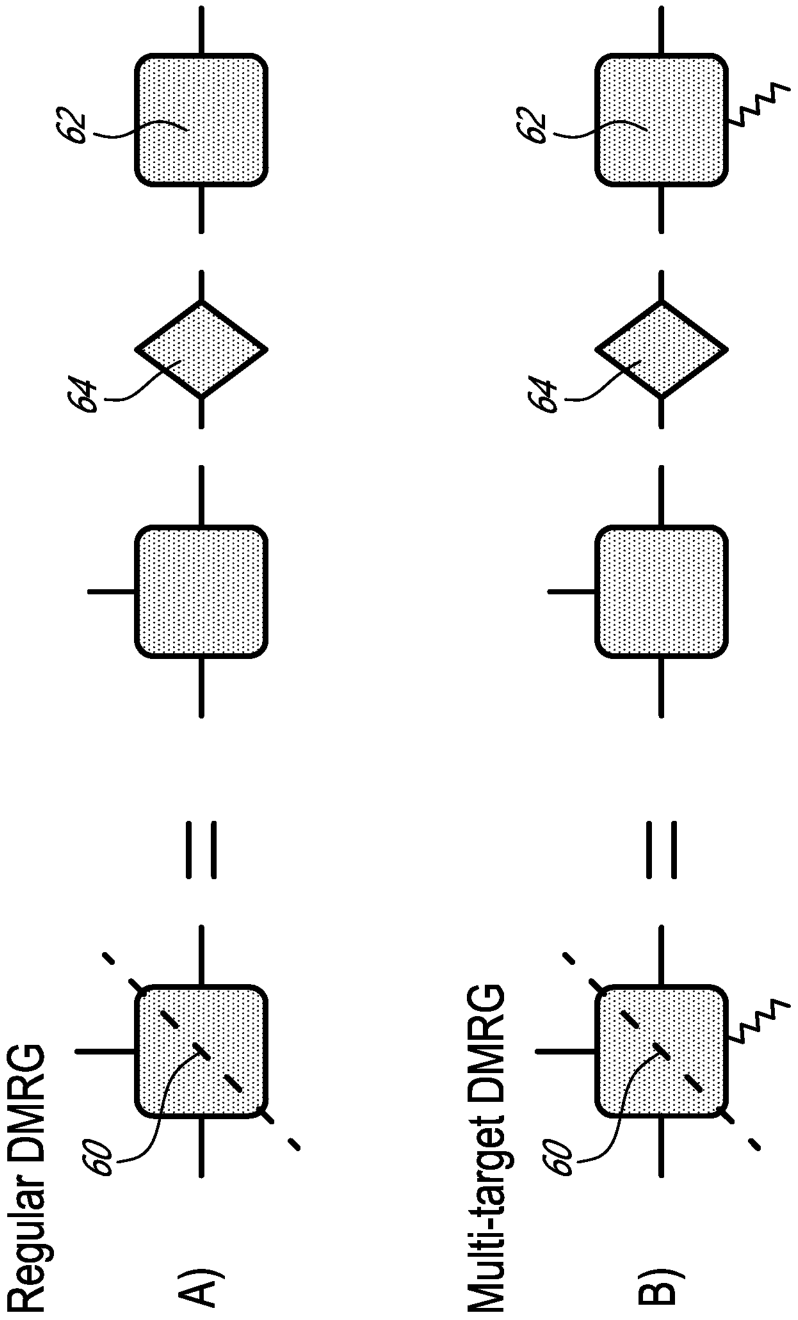
FIG. 8 is a diagram schematizing a move to the right for the orthogonality center on the MPS.

In FIG. 8, a dashed line 60 represents how the indices are grouped on the MPS tensor. Those indices above and below form the two separate groups for the SVD. The resulting blue 62 and red diamond tensors 64 are contracted into the tensor to the right of the original site (not shown). This completes a move to the right for the orthogonality center on the MPS.

B) Targeting Multiple Excitations with DMRG

The DMRG algorithm can be applied to more than one excitation by producing an effective ansatz, or special case of MPS.

i) Bundled MPS

In order to encode more excitations, one can add an extra index onto one of the tensors of the MPS $$|\psi\rangle = \sum_{\{\sigma_i\},\{a_i\}} A^{\sigma_1\xi}_{a_1} A^{\sigma_2}_{a_2 a_3} \ldots A^{\sigma_{N-1}}_{a_{N-2}a_{N-1}} A^{\sigma_N}_{a_{N-1}} |\sigma_1\sigma_2 \ldots \sigma_N\rangle \tag{7}$$

Figure 9:
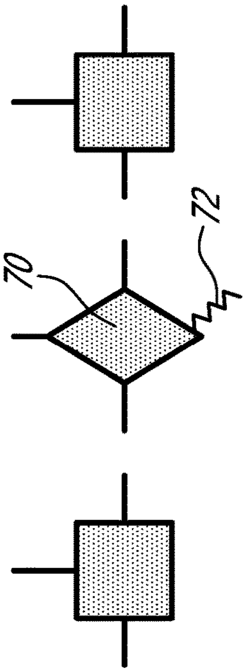
FIG. 9 is a diagram showing a matrix product state with an extra index indexing excitation number.

The extra index ξ labels each excitation. Diagrammatically, we represent this as in FIG. 9 where an extra index 72 is attached to the center of orthogonality 70 (diamond shape).

In order to construct the exact MPS from the set of eigenvectors when solving the full Hamiltonian, the MPS representation of each excitation can first be obtained individually. The MPSs can then be joined together, using the following operation which generalizes a direct sum to a tensor.

The direct sum operator, ⊕, can be defined as one that extends a set of subscripted indices. For example, the traditional direct sum acting on matrices $A_{ab}$ and $B_{ab}$ would give $$A_{ab} \underset{ab}{\oplus} B_{ab} = G_{xy} = \begin{pmatrix} A & 0 \\ 0 & B \end{pmatrix} \tag{8}$$

where x and y represent newly extended indices of the first and second index of each tensor joined together. If an index is not represented, then it remains unchanged. This also implies that it must have the same dimension between the two tensors being joined together. For example, $$A^{\sigma_1}_{a_{j-1}a_j} \underset{a_{j-1}a_j}{\oplus} A^{\sigma_1}_{a_{j-1}a_j} = A^{\sigma_1}_{xy} \tag{9}$$

where again x and y are the result of joining the indices $a_{j-1}$ and $a_j$ together.

Given the MPSs defined for each excitation, we may trivially represent the MPS with Eq. (7) with ξ of size 1, a trivial reshape of the tensor. All tensors can then be joined along that index and the excitation index, $$\bigoplus_{a_{j-1}a_j\xi} \psi^{\sigma_\xi}_{a_{j-1}a_j} = \psi^{\sigma_j\xi}_{xy} \tag{10}$$

to obtain the bundled orthogonality center. Any other site simply omits the ⊕ operation on the ξ index.

Having now constructed the bundled MPS, we can run DMRG. There are a few extra computational steps that must be applied to move the orthogonality center. This requires us to permute the ξ index to one side (left if moving left, right if moving right) in order to transport this index along the lattice with each SVD.

ii) Single Site Excitations

DMRG algorithm has been demonstrated above with two sites. Alternately, and perhaps even preferably, DMRG can be implemented using single site. This becomes important for application to, in particular, superconducting circuits since the effective size of the physics index ($\sigma_j$) can be extremely large (a few tens, perhaps 15-20). A single site implementation can be faster than a two-site implementation by a factor of the size of the physical index.

The DMRG algorithm for a single site can then be expanded to expand the link index on the left ($a_{j-1}$) or right ($a_j$). The expansion can be the Hamiltonian acting on the wavefunction tensor since this can be the first best guess in the direction that the wavefunction must travel to decrease the energy. A noise parameter a can be applied to limit the magnitude of this move.

The noise tensor can be $$\alpha\mathcal{H}^{\sigma_j\sigma_j'}_{b_{j-1}b_j}\psi^{\sigma_j}_{x_{j-1}x_j} = \Psi^{\sigma_j'}_{a_{j-1}a_j} \tag{11}$$

where $a_{j-1}=(b_{j-1}x_{j-1})$ is a reshaped index and $a_j=b_jx_j$, and $\sigma_{j'}$ was renamed $\sigma_j$. The concatenation can thus be $$\psi^{\sigma_j}_{a_{j-1}a_j} \underset{a_{j-1}\ or\ a_j}{\oplus} \Psi^{\sigma_j}_{a_{j-1}a_j} \tag{12}$$

depending on if we are sweeping left or right.

The single-site reduced Hamiltonian can be formed using the contraction order as shown in FIG. 11. This can be reasonably efficient in terms of avoiding a permute, but other contraction orders can be used there. To aid convergence, the $\mathcal{H}\Psi$ term can be used as in ground state DMRG with some predefined α noise term. One can trivially add ξ to Eq. (12) to get the version for excitations. This can greatly decrease the computational time by speeding up convergence.

Figure 10:
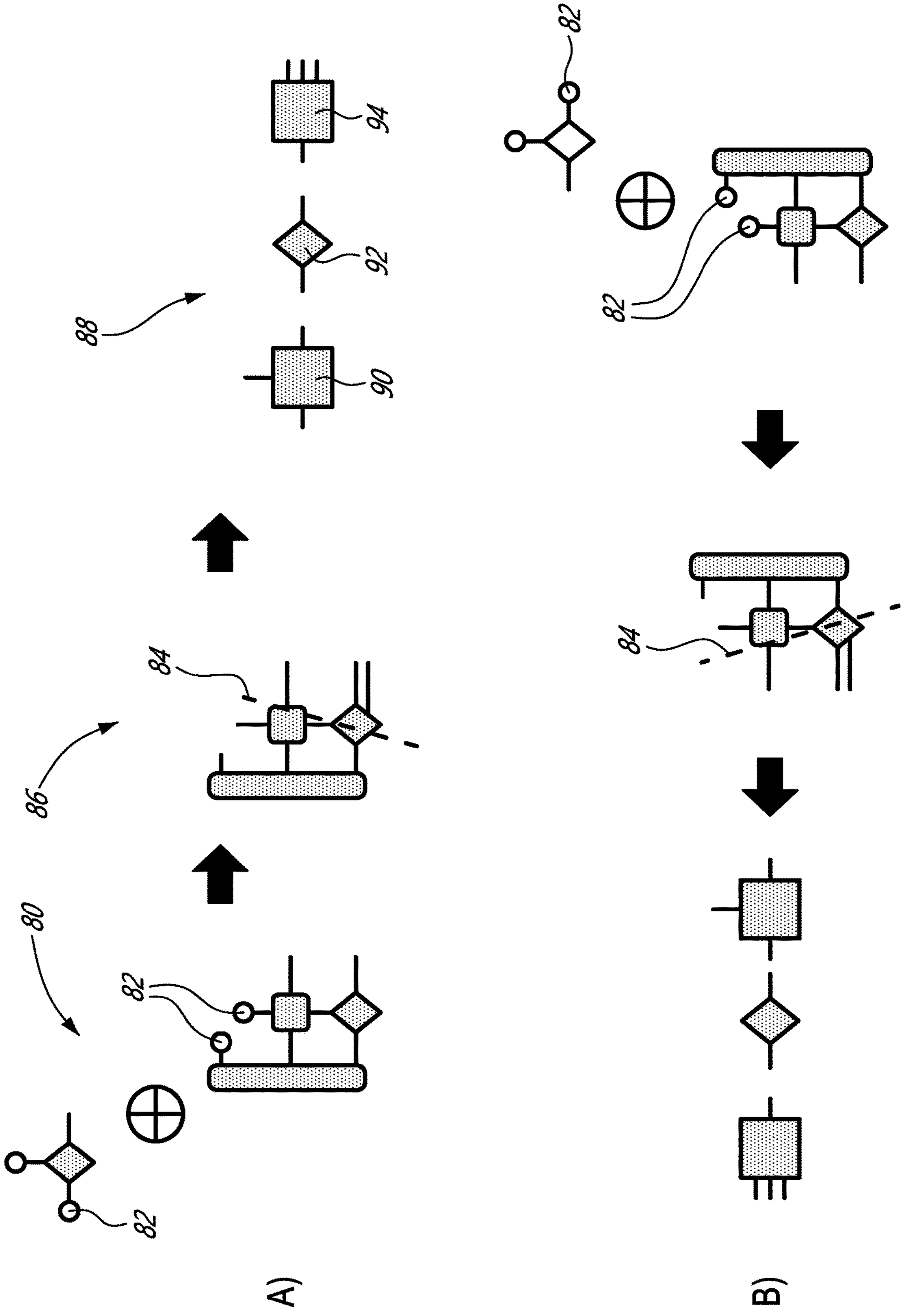
FIG. 10 is a diagram schematizing the expansion and movement for a strictly single-site DMRG implementation.

FIG. 10 schematizes the expansion and movement for a strictly single-site DMRG implementation. A) if sweeping from left to right, the MPS tensor is expanded with Eq. (11) as shown in the first FIG. 80 on the left. The indices marked with a grey circle 82 are not joined via concatenation. The resulting tensor 86 is decomposed according to the separation by the orange dashed line 84. The resulting tensors form 88, in order, the new MPS tensor 90 and the two remaining tensors (red diamond 92 and blue tensor 94) are contracted onto the tensor on the right (not shown). Either the left index on the next tensor can be expanded with zeros trivially or the top and middle index of the blue tensor 94 can be removed. B) is similar to A) but for a sweep from right to left. If these steps are used on the bundled MPS, the diagrams are identical but with an extra index on the orthogonality center that is grouped to the left (right) in the left move (right move) during the SVD.

iii) Block Krylov

The step of how the Lanczos step is modified so that all excitations in the bundle are changed together can merit particular attention.

Traditional Lanczos approaches follow the recursion relation given by Eq. (4). This entire equation can be reformulated according to the Block Lanczos technique as $$\Psi_{p+1}B_{p+1}=\mathcal{H}\Psi_p-\Psi_pA_p-\Psi_{p-1}B_p \tag{13}$$

where bold faced characters A and B are matrices acting on the additional index of the bundled MPS that contain the scalar $\alpha$ and $\beta$ coefficients. Also, $p\in\{0, \ldots, N\}$ indexes the times Eq. (13) is applied (up ton times). Diagrammatically, Eq. (13) is represented in FIG. 11.

A first step can be to check that the MPS can solve for the requested number of excitations. If, for example, the MPS has dimensions (2, 2, 4) and the number of excitations requested is greater than 16, then the total Hilbert space on this site is not sufficient to generate those excitations. If this is the case, the MPS is truncated on the excitation index. This can present an issue when using quantum number symmetries, this can mean that symmetry sectors that we request can be thrown out. In order to remedy this, a list is provided to the block Lanczos algorithm. If this list is not completely represented (or if there are more excitations than requested from the list) on the excitation index, then the missing quantum numbers can be added to the excitation index (or the unwanted excitations can be removed).

A second step can be to normalize the bundled MPS tensor. This can be done by a SVD, grouping the excitation index on the right and the others on the left, but we discard the D matrix and contract only U and $V^\dagger$, giving $UV^\dagger$. The input to the SVD is always normalized as in any Lanczos algorithm, but for consistency with the Lanczos loop, we will normalize here. This can also have practical use in real algorithms if for some reason a non-normalized wavefunction is input to a DMRG algorithm (e.g., starting from a purely random MPS or optimizing over $$\hat{c}_j^\dagger|\psi\rangle$$

without normalizing first for convenience).

A third step is to construct $\mathcal{H}\Psi_p$. This can be performed using the contraction order shown in FIG. 11. After this, we store $\mathcal{H}\Psi_p$ and also use it to construct the next $A_p$ which is the contraction of $\mathcal{H}\Psi_p$ onto itself, leaving only two excitation indices. The matrix $A_p$ is then contracted onto the excitation index of $\Psi_p$ and subtracted from $\mathcal{H}\Psi_p$.

On the first iteration of this block Lanczos procedure, this is sufficient to compute the $\Psi_2$ bundle since $B_p$ is a trivial zero matrix, meaning it does not appear in the first iteration of the recursion. If this is the first iteration, we return to normalizing the tensors.

The next step is to compute $\Psi_{p+1}B_{p+1}$. We can do this from the discarded D matrix from the normalization and form $$B_{p+1}=VDV^\dagger \tag{14}$$

where the input to the SVD was $\Psi_p$. The entire technique is known as a polar decomposition. We use D only and not $D^2$ since the $\beta$ coefficient in regular Lanczos is related to the square-root of the wavefunction's norm. We could consider using a QR decomposition in order to obtain both B and $\Psi'$, and this would be known as Banded Lanczos. We note that our choice of Block Lanczos here could be replaced by Banded Lanczos or another method and achieve the same results. However, this only constitutes computing the matrices B in Eq. (14) in a slightly different way.

The matrix $B_p$ is the contracted onto the excitation index of $\Psi_{p-1}$ and subtracted from $\mathcal{H}\Psi_p-A_p\Psi_p$. This generates $\Psi_{p+1}$ and we can return to the normalization of $\Psi_p$ for the next iteration.

If the maximum number of iterations is reached (or if a convergence criterion is achieved), then the resulting super matrix of the A and B matrices can be assembled into a block-tridiagonal matrix, e.g. a matrix in the form $$\breve{M}=\begin{pmatrix} A_0 & B_1^\dagger & 0 & \ldots & 0 \\ B_1 & A_1 & B_2^\dagger & \ldots & 0 \\ 0 & B_2 & A_2 & \ddots & \vdots \\ \vdots & \vdots & \ddots & \ddots & B_n^\dagger \\ 0 & 0 & \ldots & B_n & A_n \end{pmatrix} \tag{15}$$

where the check operator $\breve{M}$ is used to denote a super-matrix. Note that the B matrices are upper-right triangular matrices. The super-matrix $\breve{M}$ can be diagonalized just as in regular versions of Lanczos where the coefficients $\alpha$ and $\beta$ are arranged into a tridiagonal matrix and diagonalized. The resulting lowest lying eigenvalues of $\breve{M}$ give the energies of the excitations that we solve for.

If quantum number symmetries are requested in a specific embodiment of the method, the lowest energies in each sector can be retained for the new bundled MPS tensor.

Consistent with other implementations of DMRG, we only require two iterations of this algorithm at each step of the DMRG sweep to avoid over-optimizing in the wrong environment that is created.

When expressing the Block Lanczos method as a tensor network, the Krylov step of a DMRG calculation is replaced with the diagrams of FIG. 12.

Figure 13:
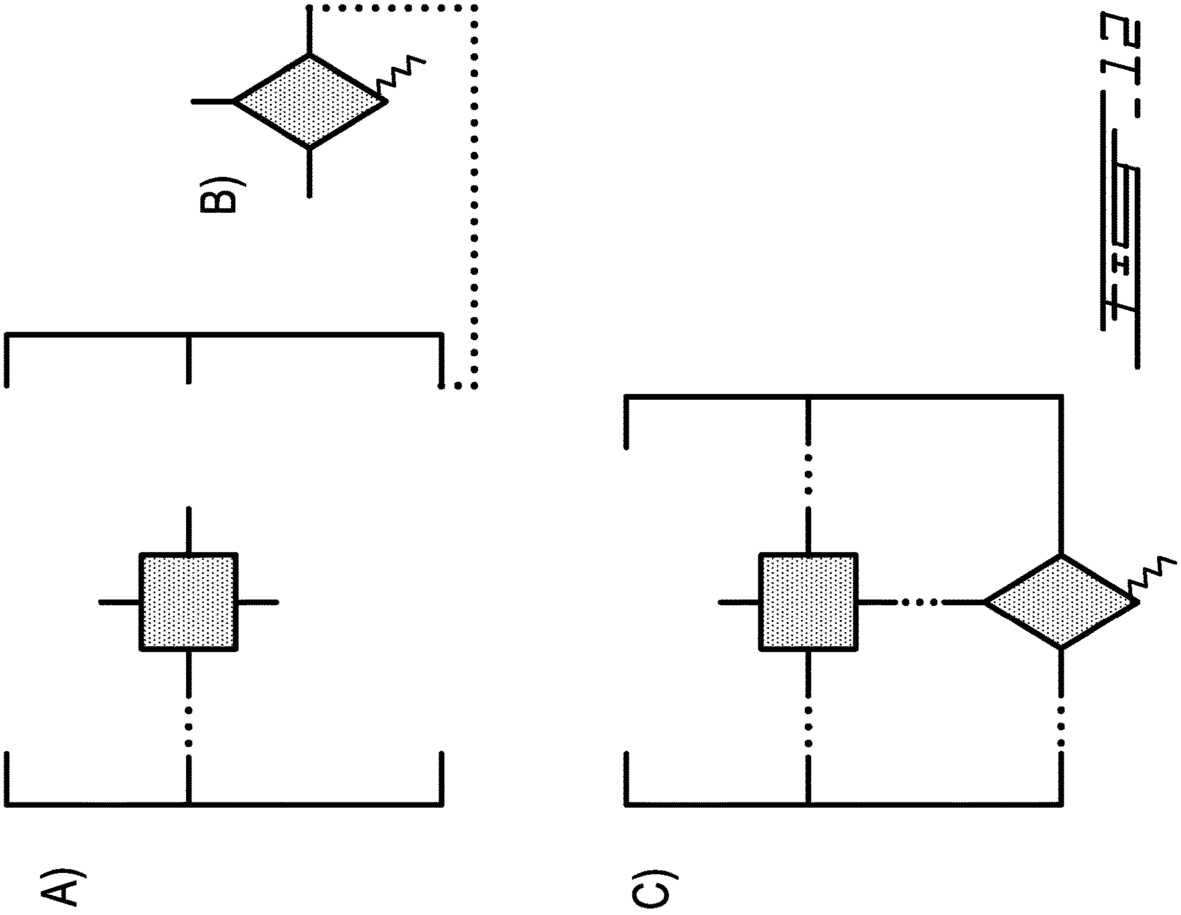
FIG. 13 is a block diagram of another example of a method for solving a Hamiltonian.
Figure 13:
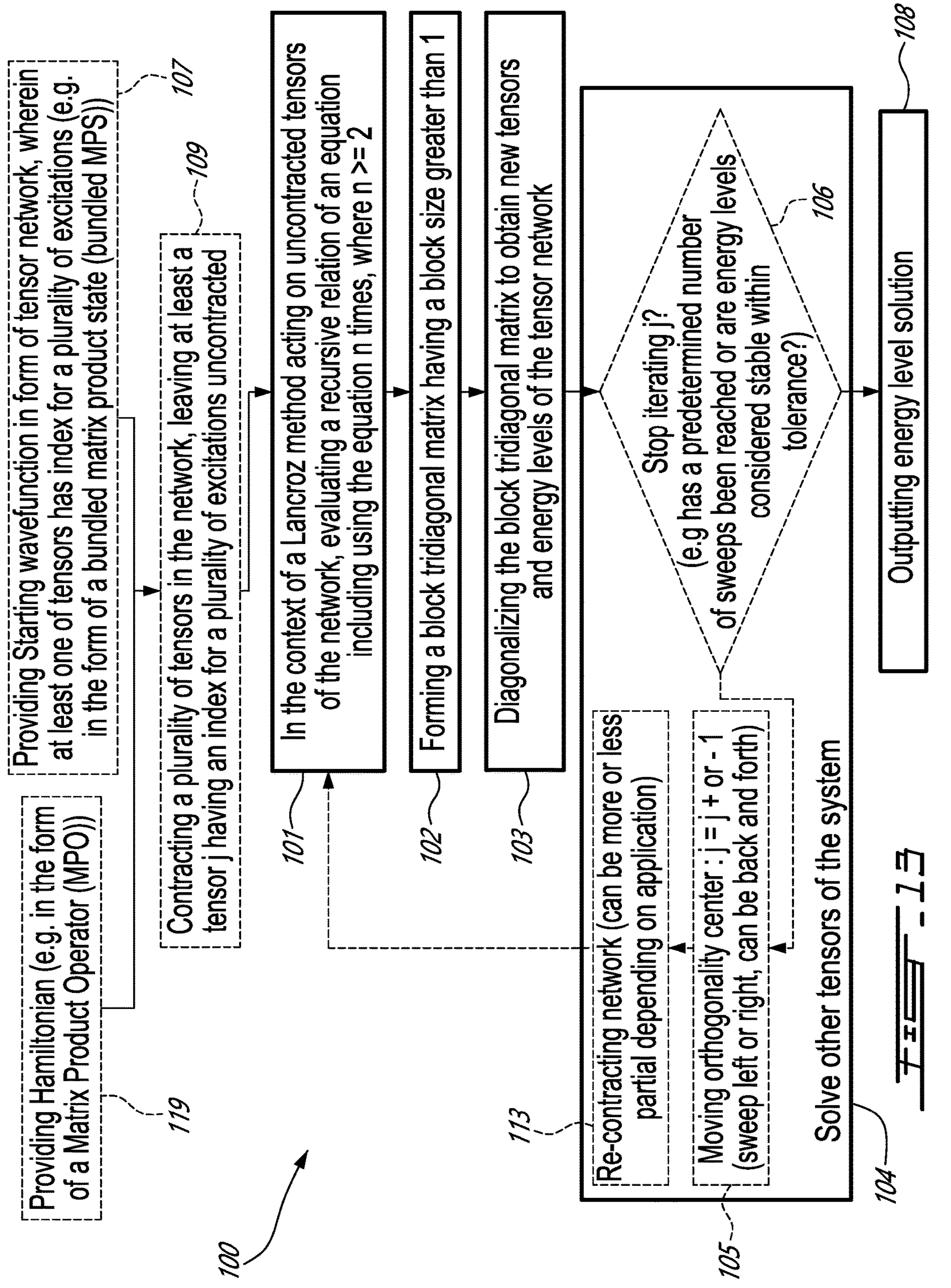

Generally, a possible implementation in accordance with Block Lanczos is represented in the block diagram 100 of FIG. 13.

II—Other Example Embodiments

A) Regular Lanczos

Regular Lanczos can be used in other embodiments in order to compute the excitations, but this strategy may be less efficient and/or more difficult to implement.

There is also the possibility to add a penalty to an excitation, $\lambda|\Psi\rangle\langle\Psi|$, with some coefficient $\lambda$. Once the penalty is added to the Hamiltonian, we re-rerun DMRG to find the next excitation. However, this does not guarantee that we will converge easily, and this method gets progressively slower with more excitations penalized.

B) Parallelization

Parallelization can allow to achieve a speed increase by contrast to an algorithm not using parallelization. Speed differs by number of processor cores that you use. Independent portions of the algorithm, corresponding to sections of the MPS, can be run on corresponding, different, cores. We are able to segment sections of the MPS by moving the orthogonality center to a particular site, performing a polar decomposition on the left and right, then moving one of the orthogonality centers to the next site and repeating. We also then need to join the two orthogonality centers, which can be achieved by bundling the two tensor portions into a bundle MPS and performing a block Lanczos.

In a regular DMRG algorithm there are several operations which are parallelized, however, some operations require only a single thread, so the algorithm can never be fully parallelized at all times. By using a real space parallelization algorithm, the single thread operations can run simultaneously and we get a speed improvement.

In a quantum physics problem, characterizing the full quantum ground state grows exponentially with the system size. Obtaining solutions to quantum problems rely on effective approximations that make a solution accessible. Approximations that have a high enough fidelity with the true ground state can reveal properties of a system necessary for technological application.

In order to solve quantum systems, renormalization can produce a smaller effective problem with fewer degrees of freedom, yet the solution of the renormalized model has the same basic features as the full model. One manifestation of a renormalization group can be found in tensor network algorithms.

In this class of algorithms, a wavefunction ansatz is created that allows for a truncation of irrelevant degrees of freedom in terms of elements of a reduced density matrix. By choosing to use the density matrix to give elements that contribute non-negligibly to the ground state, we can obtain high accuracy, even if only a few elements of the density matrix are kept. This has a strong connection with entanglement between two partitions in a system. One common tensor network ansatz for a wavefunction is the matrix product state (MPS), which is ideally suited for one-dimensional, gapped Hamiltonians with short-range interactions. The method can be applied to any system, but more computational effort may be expended in expressing the wavefunction as a MPS, and other methods using different ansatze can be used to keep the computational cost low.

The MPS formalism is useful since one of the premiere methods of a tensor network is the density matrix renormalization group (DMRG), which is known to be efficient where a MPS can capture the relevant degrees of freedom with a small bond dimension, which we refer to as entanglement local. When using a DMRG method, the speed of the computer code is important in order to obtain answers in a timely manner. Finding all parts of the code where it is better to parallelize the core functions (contraction, decomposition, etc.) can be required to reach the best performance. However, even in the best codes, single thread operations are required in the natural use of the ground state. It can be extremely time consuming to parallelize each of the operations—such as the permuting of dimensions or reshaping—and many of these operations must be executed in order, preventing mass parallelization of every step.

Even beyond the single thread operations, a proper parallelization scheme for DMRG can be required to handle large lattices. A method to handle this can use a real-space parallelization scheme for DMRG. In essence, the MPS can be divided into sections and each section is evaluated independently. Operations to join MPS sections together rely on using at least two MPS tensors. Thus, the scheme relies on a series of designated bonds (so this algorithm is bond-centric). This is disadvantageous for the DMRG algorithm.

DMRG can renormalize down to only one site, culminating in the strictly single-site (3S) algorithm. The 3S algorithm contains a self-adjusting noise term for the DMRG algorithm to avoid convergence to a meta-stable state, and the single-site nature of the algorithm gives a reduction in the computational speed by a factor of the dimension of the physical index.

In one embodiment, an alternative real-space parallelization scheme is presented that is adapted specifically to a single-site implementation. When acting on the ground state MPS, this site-centric parallelization scheme suffers from no slowdowns, does not need to compute inverses anywhere, nor is there ill-behavior in the limit of large physical index size or increasing cores. Further, the Lanczos update of the partition sites can be run for the same number of iterations as in the DMRG code and not to full convergence. To make such an algorithm, we use a combination of polar decompositions and the inverse operation of concatenation to a bundled MPS tensor. To resolve the bundle, we minimize the MPS tensors with a block Lanczos routine to find multiple excitations simultaneously in a single DMRG run. An extension of the MPS can be extended to multiple excitations, called multi-target DMRG. A similar approach can use the same tools but instead of encoding different excitations, the bundle will contain tensors from the left and right of the system in the bundled MPS, in this context the left and right can be considered excitations of the true ground state.

In addition to the site-centric parallelization algorithm, the block Lanczos technique can be used in combination with a polar decomposition to give a highly efficient algorithm to compute the unit cell of an infinite system. This can be named the block Lanczos infinite matrix product state (BLIMPS) algorithm and can require fewer Krylov subspace expansions to generate the polar decomposition because we use the block Lanczos to resolve excitations from the left and right of the system.

Bond-centric parallelization will first be discussed, followed by site-centric parallelization, the performance compared against other methods for calculating the unit cell of an infinite system, and to compare methods of solving periodic systems versus unit cell of a potentially infinite system.

i) Bond-Centric Parallelization Algorithm for Matrix Product States

Figure 14:
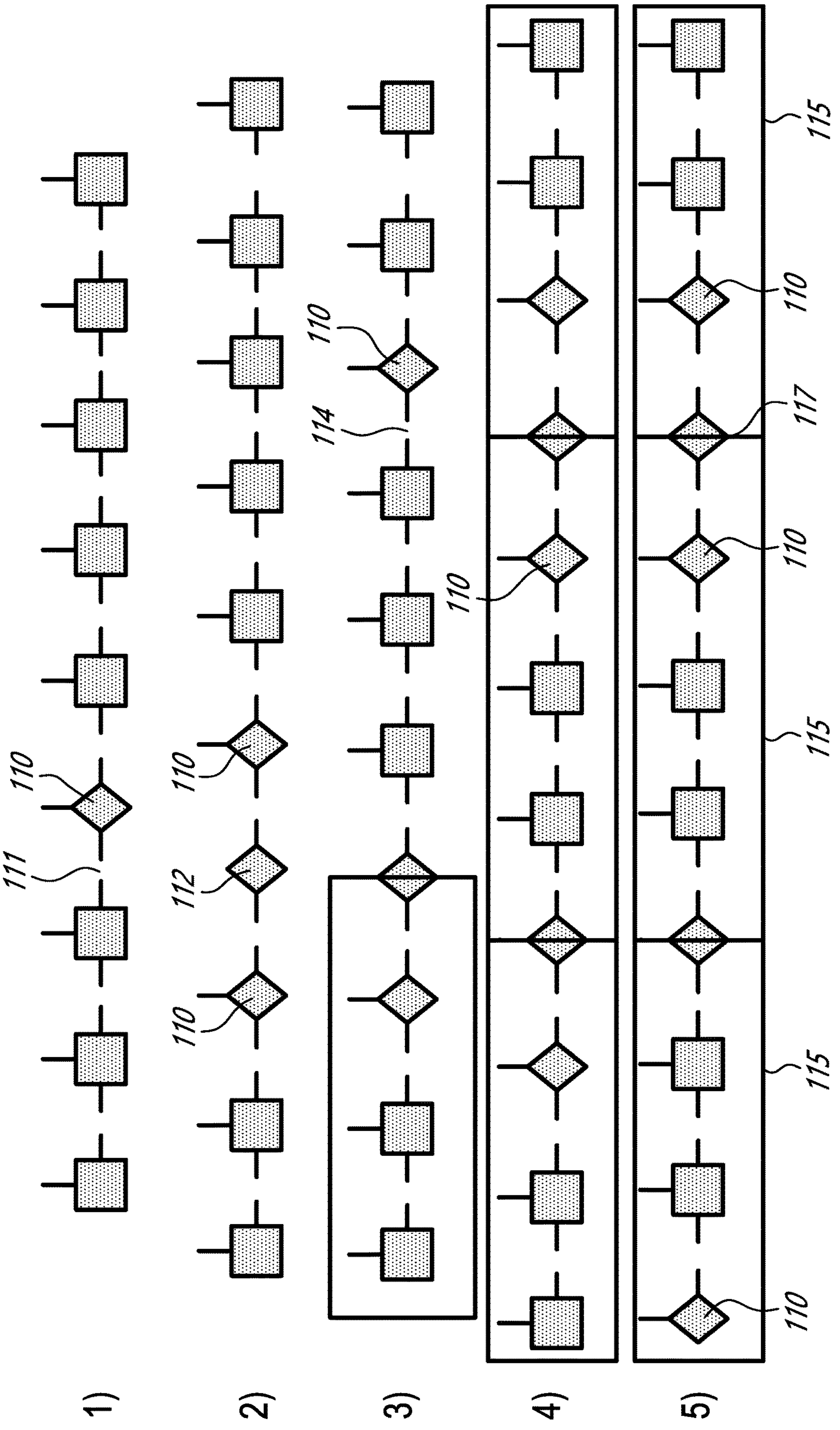
FIG. 14 is a diagram showing operations necessary to partition a MPS into separate partitions for the bond-centric parallelization algorithm.

Given a MPS, one may select groups of sites to belong in particular partitions. Each boundary is a bond that lies between two tensors, and these selected bonds can be referred to as partitioning bonds. Once the partitioning bonds are selected, the MPS can be broken up into independent sections by first moving the orthogonality center 110 to the tensor to the left or right of the bond, taking a singular value decomposition (SVD) of the two adjacent tensors of the MPS, obtaining $UDV^\dagger$, and then introducing the identity $D^{-1}D$ between either U and D or D and $V^\dagger$, which introduces a second orthogonality center 110. FIG. 14 (second line) shows how this is done with a diagram notation common to tensor networks.

More specifically, FIG. 14 shows operations necessary to partition a MPS into separate partitions for the bond-centric parallelization algorithm.

1) The orthogonality center 110 is moved to one of the two sites adjacent to a bond that is designated as an interface between two partitions 111. 2) The inverse of the orthogonality center 112 on a given bond, $D^{-1}$, is saved. 3) The orthognality center 110 is moved to the next partitioning bond 114. 4) Another orthogonality center 110 is created and saved. 5) Orthogonality centers 110 are moved and staggered, so that alternating partition 115 bonds 117 have an orthogonality center to their left and right.

Orthogonality centers 110 are moved to be staggered so that alternating partitioning bonds 117 have an orthogonality center 110 to their left and right (step 5 of FIG. 14). The reason to stagger the orthogonality centers 110 is to ensure that when we apply the update to the partitioning bond 117, we maintain orthogonality.

Once the sites are partitioned 115, DMRG is run so that the orthogonality center 110 in each section 115 moves over the lattice once (i.e., crosses all tensors in a partition once from left to right or right to left). We count this as a half-sweep over the lattice. Whenever there are two orthogonality centers 110 that share a common bond, they are recombined by reintroducing $D^{-1}$ which was kept when the MPS was partitioned. Then, the two-site problem is used in a Lanczos algorithm to generate an updated pair of tensors.

The Lanczos algorithm is run until the two sites are fully converged, in contrast with the traditional DMRG algorithm's reduced number of Lanczos steps (generally, only 2 steps are required). A DMRG algorithm does not need to converge the reduced problem since the environment tensors used to construct it are not correct for the true ground state. Hence, updating the tensors only a small amount is required there. Here, the full Lanczos iteration is performed to avoid convergence problems. If this is not done, the true ground state is not reached. In other words, storing $D^{-1}$ does not guarantee that the orthogonality centers, when they return to the partitioning bond will be the true ground state. This is true even if we started with the exact ground state and applied this procedure.

Once the two sites are updated, a new $D^{-1}$ tensor is generated when the two sites are separated with an SVD, and the algorithm continues. In order to ensure that the inverse of D is taken to appropriate accuracy, a recursive SVD algorithm can be used, but is not necessary if one always normalizes before using the Lanczos algorithm. More discussion on the bond-centric algorithm is postponed until after the site-centric algorithm is introduced.

Figure 15:
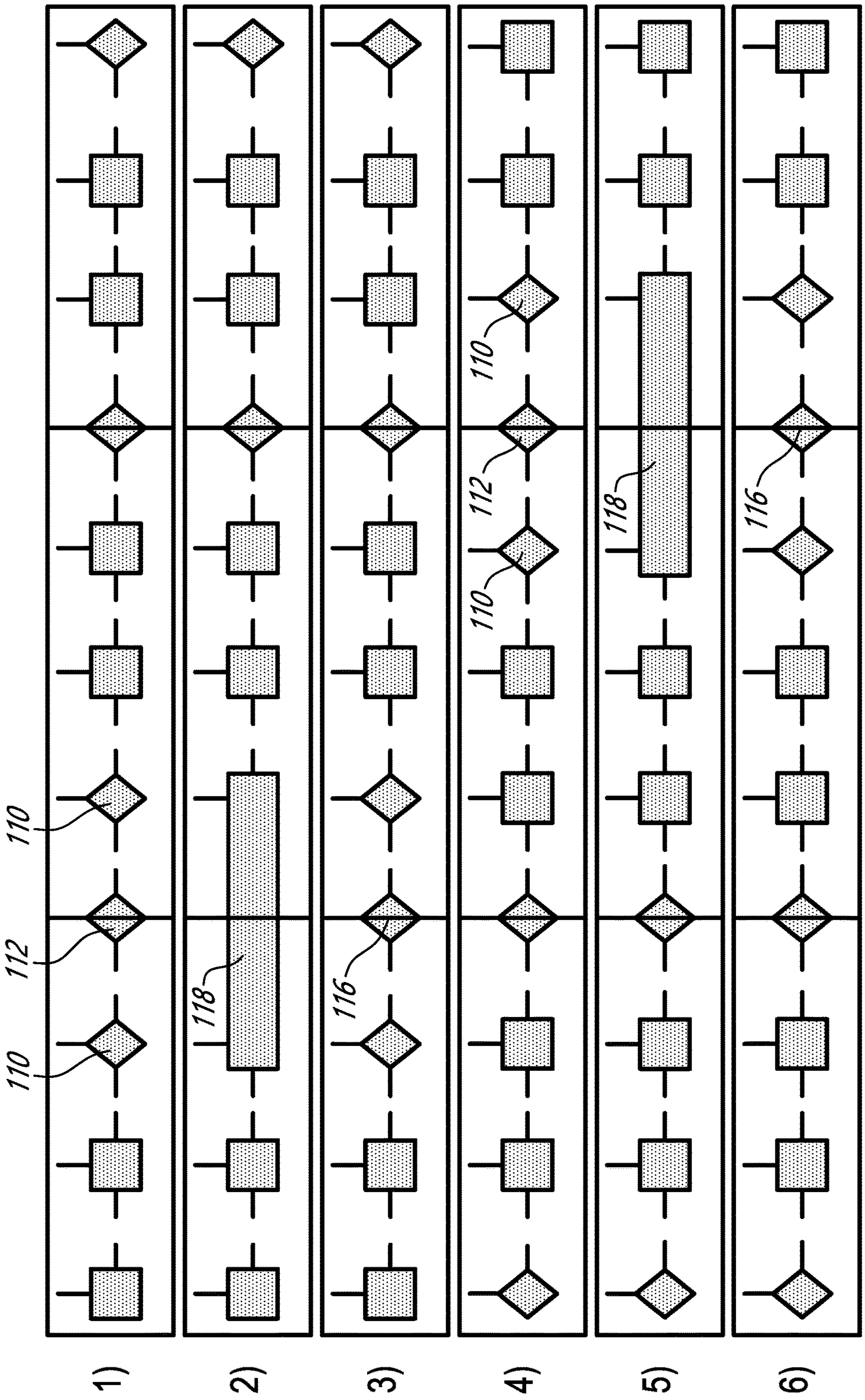
FIG. 15 is a diagram showing steps involved in a two-site parallelized DMRG algorithm.

FIG. 15 shows the steps involved in a two-site parallelized DMRG algorithm. 1) DMRG is run for one-half sweep. 2) Orthogonality centers 110 sharing a bond are joined with the stored inverse orthogonality center 112 into a two-site tensor 118. A full Lanczos algorithm is run until the two-site wavefunction is converged. 3) The two-site tensor 118 is decomposed with a SVD and a new orthogonality center inverse 116 is stored. 4) DMRG is run for one half sweep. 5) Even numbered bonds undergo the same steps as in step 2) above. 6) A new orthogonality center inverse 116 is generated on decomposition of the two-site tensor 118.

ii) Site-Centric Parallelization Algorithm for Matrix Product States

In order to generate a suitable parallelization algorithm that requires only one MPS tensor at each step, we explicitly make use of the 3S algorithm. We also abandon the selection of bonds to designate partitions. If we chose bonds with a single site algorithm, for two adjacent MPS tensors sharing that bond, there must be a two-site step involved.

Therefore, we choose to designate a single site as the border of two MPS partitions. We will find that our resulting algorithm does not hinder convergence despite this. For a given number of parallel threads np (strictly less than the nN sites of the system) available, we will need to designate np−1 sites as partition-sites.

Moving the orthogonality center to the first partition site, we must introduce a new operation to separate the site to generate two orthogonality centers, one on the left and the other on the right. The steps will be illustrated diagrammatically in FIG. 16.

Figure 16:
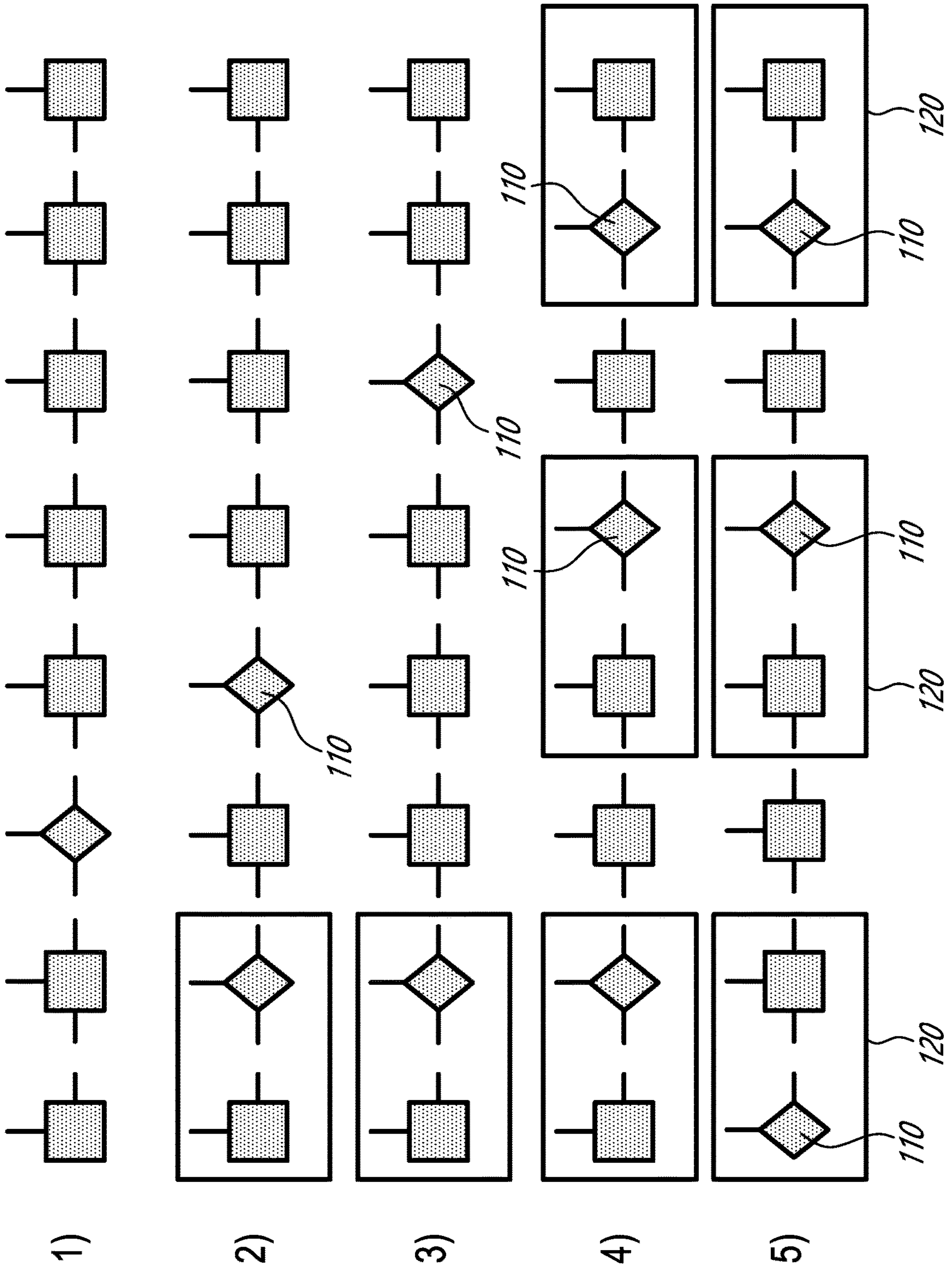
FIG. 16 is a diagram showing shows the splitting scheme for the MPS into several sections.

Indeed, FIG. 16 shows the splitting scheme for the MPS into several sections 120. Two tensors are saved and stored between each section 120 which plays a crucial role later for recombining. The tensors are decomposed according to a polar decomposition (see FIG. 19). In the last step here, the orthogonality centers 110 are moved to be on the first or last site in each section 120 (alternating by section 120), although any staggered arrangement is acceptable. Boxes outlining certain sites denote a section 120 of the MPS.

Since we are only manipulating one tensor, then the locality of the tensor network might mislead us into thinking that action on this tensor does not affect tensors in the other partition. This is not true, however, since the two partitions share a central MPS tensor whose link indices are treated differently in this decomposition. Consider that if we truncate the index on the right to a dimension of 1, then the stored MPS tensor corresponding to the left side is not truncated at all. Then the basis that the central tensor is written is not the same for the left and right partitions. A way to decompose the central tensor without writing it in an improper basis is developed next by use of a polar decomposition.

A polar decomposition can be an ideal way to separate the single tensor. The polar decomposition can be obtained from a SVD of the tensor. If we choose, as seen in FIG. 17A), to first perform the polar decomposition on the left of the tensor (i.e., grouping the left link index separate from the other indices on the MPS tensor), we obtain $$\psi_{a_{i-1}(\sigma_i a_i)} = U_{a_{i-1}\gamma} D_{\gamma\eta} V^{\dagger}_{\eta(\sigma_i a_i)} \tag{16}$$

where σ denotes a physical index (vertical index on diagrams), α is a link index on bond i (the bond to the right of the MPS has the same number as the site number), indices inside of the parenthesis are reshaped together. The polar decomposition is obtained by adding in a resolution of the identity $\hat{I}=U^{\dagger}U$ between the D and V matrix as $$\psi_{a_{i-1}(\sigma_i a_i)} = \left(U_{a_{i-1}\gamma} D_{\gamma\eta} V^{\dagger}_{\eta a_{i-1}}\right)\left(U_{a_{i-1}\nu} V^{\dagger}_{\nu(\sigma_i a_i)}\right) \tag{17}$$

where Einstein summation notation is used to indicate that repeated indices should be summed. We have grouped the tensors into two sets. One set is unitary $UV^{\dagger}$ and the other ($UDU^{\dagger}$) is weighted. One could have equivalently performed a QR decomposition to obtain two tensors in this form, but there is a distinct advantage to using the polar decomposition. The basis on the inner bond is maintained when performing this decomposition (i.e., the $\alpha_i$ index still expresses the bond).

One can see why the bond must remain the same during this decomposition. If, for example, we generated two orthogonality centers with different bases for the link indices, then if we may be allowed the truncate the link index on the left or right side. However, when recombining the orthogonality centers later on, we would encounter a problem that we could not do this such that the two recombined tensors (the orthogonality center contracted onto the unitary signifying the site-partition) would have the same size indices. This is completely avoided by using the polar decomposition and the necessary steps in recombining later.

Figure 17:
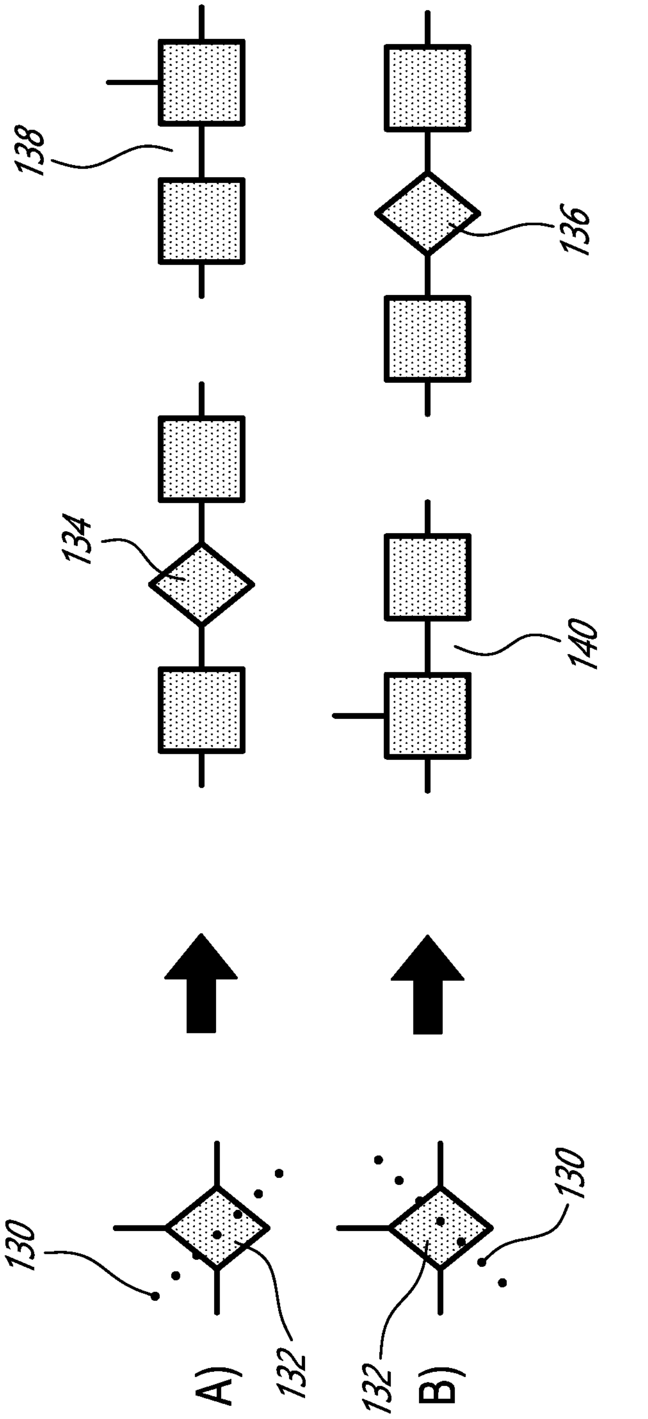
FIG. 17 is a diagram showing polar decomposition of a single tensor for the A) left and B) right.

The same procedure can be done on the original tensor Ψ but now grouping $a_i$ separate from the other two indices, $$\psi_{(a_{i-1}\sigma_i)a_i} = U_{(a_{i-1}\sigma_i)\gamma} D_{\gamma\eta} V^{\dagger}_{\eta a_i} \tag{18}$$

which can now be modified by $\hat{I}=V^{\dagger}V$ to obtain the polar decomposition on the right, $$\psi_{(a_{i-1}\sigma_i)a_i} = \left(U_{(a_{i-1}\sigma_i)\gamma} V^{\dagger}_{\gamma a_i}\right)\left(V_{a_i\nu} D_{\nu\eta} V^{\dagger}_{\eta a_i}\right) \tag{19}$$

as shown in FIG. 17, part B).

FIG. 17 shows a polar decomposition of a single tensor for the A) left and B) right. A dashed line 130 on the MPS tensor 132 denotes how the tensor is grouped for an SVD.

We have now decomposed a single tensor into four tensors 134, 136, 138, 140. Two of which can be denoted as the orthogonality center for the left partition 134 ($UDU^\dagger$) and the other is the orthogonality center for the right partition 136 ($VDV^\dagger$). The orthogonality centers can be contracted into the next tensor inside their respective partitions in preparation for a half-sweep of DMRG.

The remaining two unitary matrices 138, 140 encode the appropriate left- or right-normalized tensor on each site. The reshaping can be undone to give a rank-3 tensor. We must store both unitary tensors for the recombination step later. To see that both tensors must be stored, note that the environment used in each partition is oblivious to any change in the link basis or introduction of an orthogonality center in another partition. That the link index must remain unchanged is also important later for recombination. Hence, the stored unitary must reflect both the appropriate left and right environment, necessitating storage of both.

We have now obtained step 2 of FIG. 16. Continuing on to step 3, the orthogonality center 110 to the right of the partition-site is then moved to the next designated partition-site. The same polar decomposition is performed to obtain two orthogonality centers 110 on the left and right of the partition-site.

Just as in the bond-centric algorithm, we stagger the orthogonality centers through a series of moves.

We have now set up the MPS to be run in parallel on each section. Applying DMRG on each section can be accomplished with the current partitioned MPS.

However, one step is missing, and that is how to recombine the partition-sites once we run a half-sweep of DMRG. We can also note another hurdle here. Our choice of the polar decomposition allowed us to preserve the basis of the link index, but in a normal DMRG run, the bond dimension is allowed to grow. If our original MPS is of size 1 (a classical product state), then using polar decompositions will not grow the bond dimension.

Figure 18:
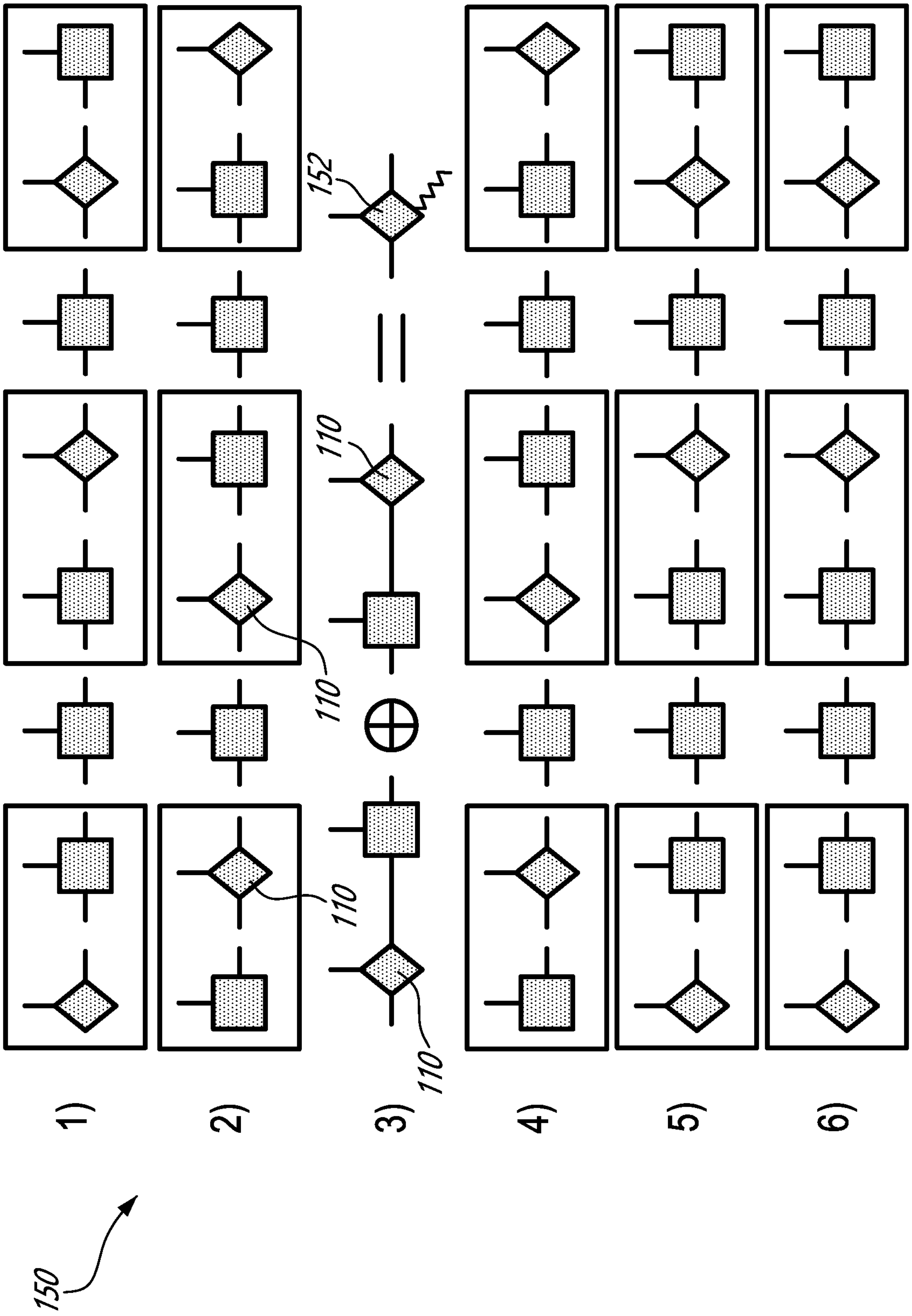
FIG. 18 is a diagram showing a sweeping schedule for sectioned MPS.

To resolve both of these difficulties, we perform the steps as in FIG. 18, showing a sweeping schedule 150 for sectioned MPS. Step 3 is explained more fully in FIG. 19.

The first two steps are simply the half-sweeps of DMRG. The first step of importance is step 3 and we have included one additional figure, FIG. 19, to explain this one step. The goals of step 3 are to recombine the orthogonality centers 110 on each site and grow the bond dimension.

Figure 19:
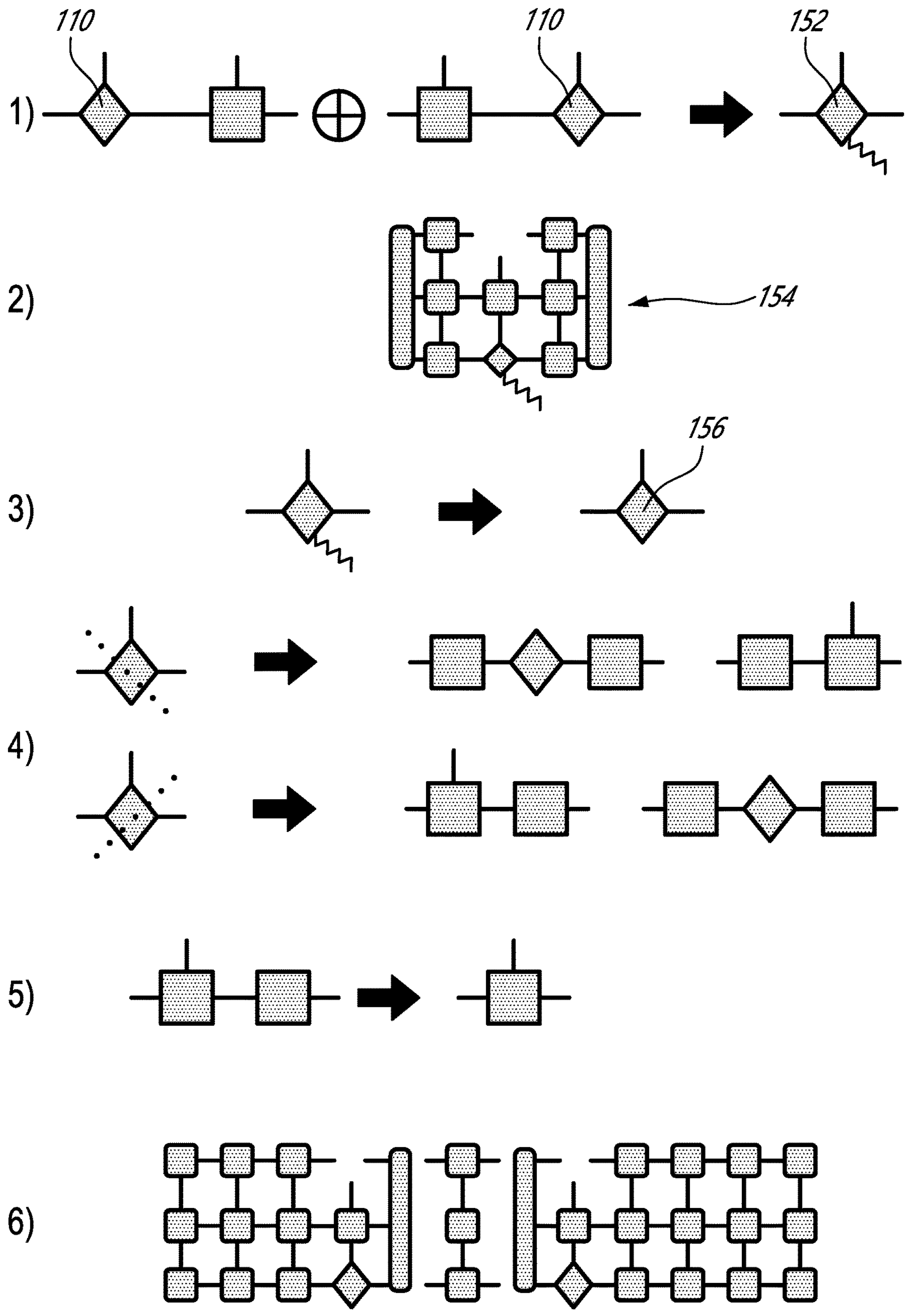
FIG. 19 is a diagram showing operations on the MPS.

Attention is now brought to FIG. 19. Operations on the MPS relating to 1) joining two orthogonality centers 110 together with a concatenation, 2) growing the bond dimension by running a 3-site DMRG 154 on the center site and the site to the left and right, 3) choosing the lowest energy solution, 4) using a polar decomposition to decompose the tensor into left and right sections while preserving the basis on the link index, as was shown in FIG. 17, 5) store two tensors for the left and right relating to the isometries generated in the polar decomposition, and 6) after contracting the weighted tensor from the polar decomposition onto the next site, a half-sweep of DMRG is run in each section. To construct the left and right environments, the two tensors stored in step (5) are used on their respective sides. Note that one can alternatively replace step 2 by first a block Lanczos minimization of only one site, choosing the lowest energy MPS tensor as in step (3) and then running a 3-site DMRG on the new ground state. Note that all Krylov expansions (here, Lanczos) are done to 2 iterations, the same as in ground state DMRG.

The first step of FIG. 19 is to contract the orthogonality centers 110 onto the saved partition-sites (appropriate for the side that the orthogonality center is contracted in to, recall that we stored two tensors for this purpose). This is then followed by concatenating those tensors together. This generates a rank-4 MPS tensor and introduces a bundled tensor 152. The excitation index represents the MPS tensors on the left and right of the system.

Note that in moving the orthogonality centers onto the partition-site, we could have used another expansion technique, but in our next step where we grow the bond dimension, this will be applied, so it is not necessary when generating the bundled tensor to first expand it.

We face a choice at this step, we can either retain the bundled tensor 152 and run a multi-targeted DMRG algorithm in the next step or we can apply a Block Lanczos technique to find the ground state from this bundle. If we choose the second option, a normal DMRG algorithm can be run.

Note that there is no issue if the two tensors are degenerate since a normalization step in the Krylov subspace expansion is equivalent to taking the Graham-Schmidt orthonormalization procedure of each excitation. This is required for a Lanczos algorithm in general. This is our first hint that this algorithm will work on the exact ground state without losing any accuracy on the wavefunction. The number of times the Lanczos operation must be run is 2 (although more could be used) and we do not find running for more necessarily helps convergence of the algorithm.

Step 2 of FIG. 19 is to run a (multi-)DMRG algorithm 154 on the partition-site and the two adjacent sites. This step allows us to grow the bond dimension of the two relevant link indices. This solves the issue with the polar decomposition not allowing for a changing bond dimension. If a multi-targeted DMRG algorithm 154 was run, we select the ground state 156 (step 3). If not, step 3 is skipped.

We then proceed (step 4) with a polar decomposition as previously shown in FIG. 17, storing both the left and right tensors for later and continue with half-sweeps of DMRG on each side.

When applied on the exact ground state wavefunction, the state is preserved with only 2 Lanczos steps. In the next sections, we examine the scaling with the number of parallel threads provided to the algorithm.

iii) Site-Centric vs. Bond-Centric algorithms

There are several features that are different between the site-centric and bond-centric algorithms. The primary advantage of the site-centric algorithm is that not as many Lanczos steps are required at the partition-sites as are required in the bond-centric algorithm at the partition-bonds.

It is probably not necessary to actually store the inverse of the D matrix at each paritioning bond. Since each time the new bond is calculated, a full Lanczos is run, starting from the normalized state provided by only the two D tensors only tends to reduce the number of required Lanczos steps by a few iterations. In order to check if a Lanczos algorithm is converged midway, one must diagonalize the tri-diagonal matrix of $\alpha$ and $\beta$ coefficients at each step to examine the change in the updated ground state energy. This can be expensive and unnecessary in light of the single-site algorithm. The site-centric algorithm retains the advantage that an inverse of the orthogonality center does not need to be computed, so there is no need for a modified SVD algorithm.

Since starting from a random state in the Lanczos step of the bond-centric algorithm is not much different than starting from the state including $D^{-1}$, the—what we call—recursive SVD real is probably also not necessary here. The point of this recursive SVD was to ensure that the precision of the singular values are obtained to sufficient precision to compute an accurate inverse. We did not find that results from the recursive SVD were much different than not using the recursive SVD.

In terms of providing the best starting state, the inverse orthogonality center is supposed to reconstruct the bond that is closest to the proper state, but use of a full Lanczos iteration is probably eliminating any advantage that this provides. We found that we still had to normalize the starting tensor for the Lanczos algorithm since it was not computed even with the recursive SVD.

It is also instructive to compare against the time spent on a single DMRG application, but one that is fully parallelized. We first compare the performance on small lattices. We find that the fully parallelized DMRG implementation can be equivalent in speed to the site-centric algorithm when parallelized in real space.

Note that in the real-space parallelized algorithm, each independent MPS section has only one core (this ignores dependence on the linear algebra operations that are controlled by a library). It is significantly faster than the bond-centric version under the same conditions because of the slowdown in the number of Lanczos steps required; however, we will note that the original proposal for the bond-centric model relied on parallelizing over several different nodes (i.e. computers) which each have their own stash of threads. We believe that the most likely test scenario (and easier to program) version is the variant with a single core in each partition of the MPS, so we will concentrate on results here. We will note that dedicating a whole compute for each MPS section will improve the runtime in each section for the DMRG there.

In the limit of large bond dimension, the need for a two-site update in the algorithm can make this step extremely expensive as well. Clearly, then, a single-site algorithm will scale better than the two-site parallelization. It is also highly desirable to need no more than two Lanczos steps to have better scaling in terms of the number of cores.

Returning the comparison of performance between the algorithms, we note two limits where the bond-centric algorithm will suffer from poor performance. As the number of parallel threads on a computer is increased, the need for a full Lanczos update will become more important and costly in the algorithm, even if this step is parallelized. In terms of the traditional DMRG algorithm, taking more Lanczos steps is not necessary in general since the system is renormalized to only a few sites, but it is not guaranteed.

In the case of a large lattice, the fully parallelized DMRG can be slower by a factor of the number of cores used as should be expected since the real-space parallel DMRG is able to more efficiently evaluate a separated MPS. The site-centric algorithm outperforms the bond-centric version, especially for larger numbers of cores since the full Lanczos update becomes very expensive. If this step is not carried to full convergence in the bond-centric algorithm, then there is an issue of how accurate the final result is and this could affect the results significantly.

C) Results for Parallelization i) Convergence of the Lanczos Step

A full Lanczos update on the partition bond may have been required. This typically means that several tens of Lanczos steps are required. Note that this step is typically the most expensive operation in a DMRG algorithm since forming the renormalized, reduced site variant of the full tensor network contains several contractions. However, for the site-centric algorithm presented here, only two Lanczos steps were required to find convergence. This can be a major speedup.

ii) Application to Multiple Excitations

The original use for the bundled MPS was on a DMRG algorithm that targeted multiple excitations (multi-target DMRG). Here, the bundled MPS is being used to encode two separate MPSs from the left and right of the system. However, nothing prohibits the inclusion of multiple excitations on the left and right of the system.

In order to modify the above discussion to include the extra excitations, everywhere the Krylov expansion must be the Block (or Banded) Lanczos algorithm. The only remaining step is to truncate the resulting MPS tensor down to the desired number of excitations instead of just 1 before performing the half-sweeps in FIG. 18.

iii) Application to Two-Dimensional Systems

Two dimensional systems are of particular interest in condensed matter physics since some of these models hold topological states of matter. It has been an active area of research in order to characterize these states with tensor network methods. Typically, the systems sizes that can be handled are on the order of a cylinder of width on the order of 10 (i.e., one of the dimensions of the two-dimensional lattice is periodic). The bond dimension that must be requested is typically large (several thousand). With the parallel scheme derived here, we find a drastic reduction in the time necessary to obtain results at large lattices and with greater bond dimension. This is due to an ideal speedup of the algorithm.

iv) Application to Periodic Systems

Because we will also be applying the basic tools used for the parallel algorithm to the determination of the unit cell of a DMRG algorithm, we will discuss how this method could be applied on a periodic system, but we will delay the results of this algorithm until we develop the infinite algorithm and compare both algorithms.

D) Application to the Infinite Computations

Many methods exist for the computation of a unit cell in an infinite system. The first is the gate-based approach of time-evolving block decimation (TEBD), using imaginary time evolution to approach the ground state. Another method is the infinite density matrix renormalization group (iDMRG) method, which is an improvement over the original scheme to do this. Recently, a tangent-space method was developed for calculations in the thermodynamic limit, called the variational uniform matrix product state (VUMPS) algorithm. This algorithm uses many improvements that have been applied to infinite TEBD (iTEBD) in order to improve convergence to the fixed points of the environment tensors. Note that iTEBD and iDMRG require two copies of the unit cell for best performance while the VUMPS algorithm requires only one. We will develop a single-unit cell algorithm.

Essentially, the VUMPS algorithm has two components. The first is to evaluate for the fixed point of the left and right environments. This is an improvement over iDMRG, which can be seen as a power method since it only takes one iteration of the recursive relation used to solve for the fixed point. Therefore, convergence can be slow there. The second component of VUMPS is the determination of the elements of the polar decomposition, except that three different Lanczos steps are required to determine the components. This represents an inefficiency we will eliminate in our algorithm.

Since we understand how the polar decomposition can be seen as an inverse operation to the concatenation of two (or more) MPS tensors into a bundled MPS tensor, and since we understand how to minimize for the lowest state in a bundled MPS tensor, we have all the tools to join MPSs representing left and right portions of a system and minimize over both simultaneously with the multi-target DMRG. Since the minimization step is to use the Block (or Banded) Lanczos on an infinite MPS, the algorithm will be known as BLIMPS.

In the BLIMPS algorithm (FIG. 20), an initial state is taken. This can be a classical product state. The start left and right environments are the same as those used for regular DMRG. We then solve the MPS in this environment.

Figure 20:
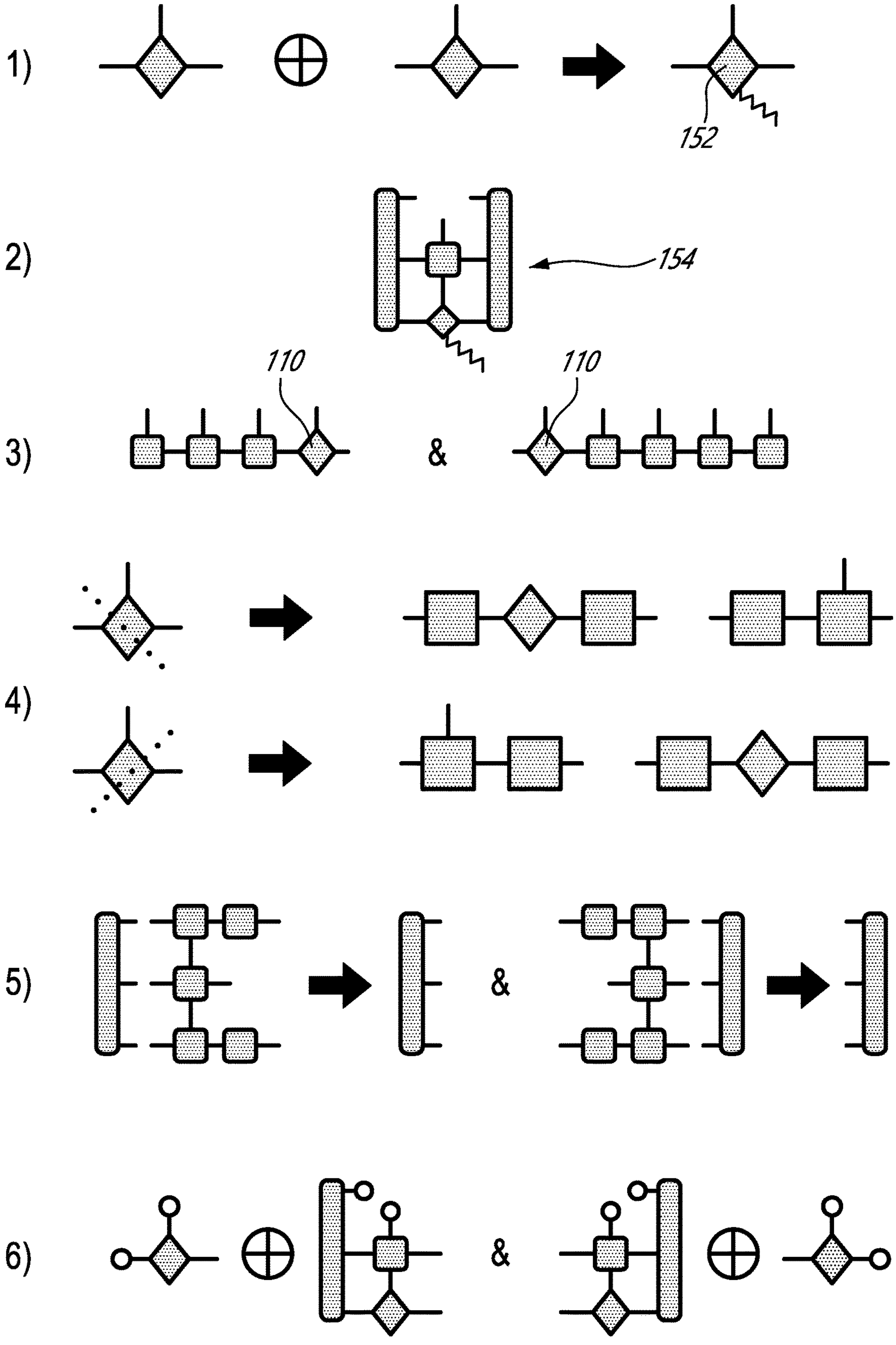
FIG. 20 is a diagram showing a BLIMPS algorithm which can be used for infinitization.
Figure 17:
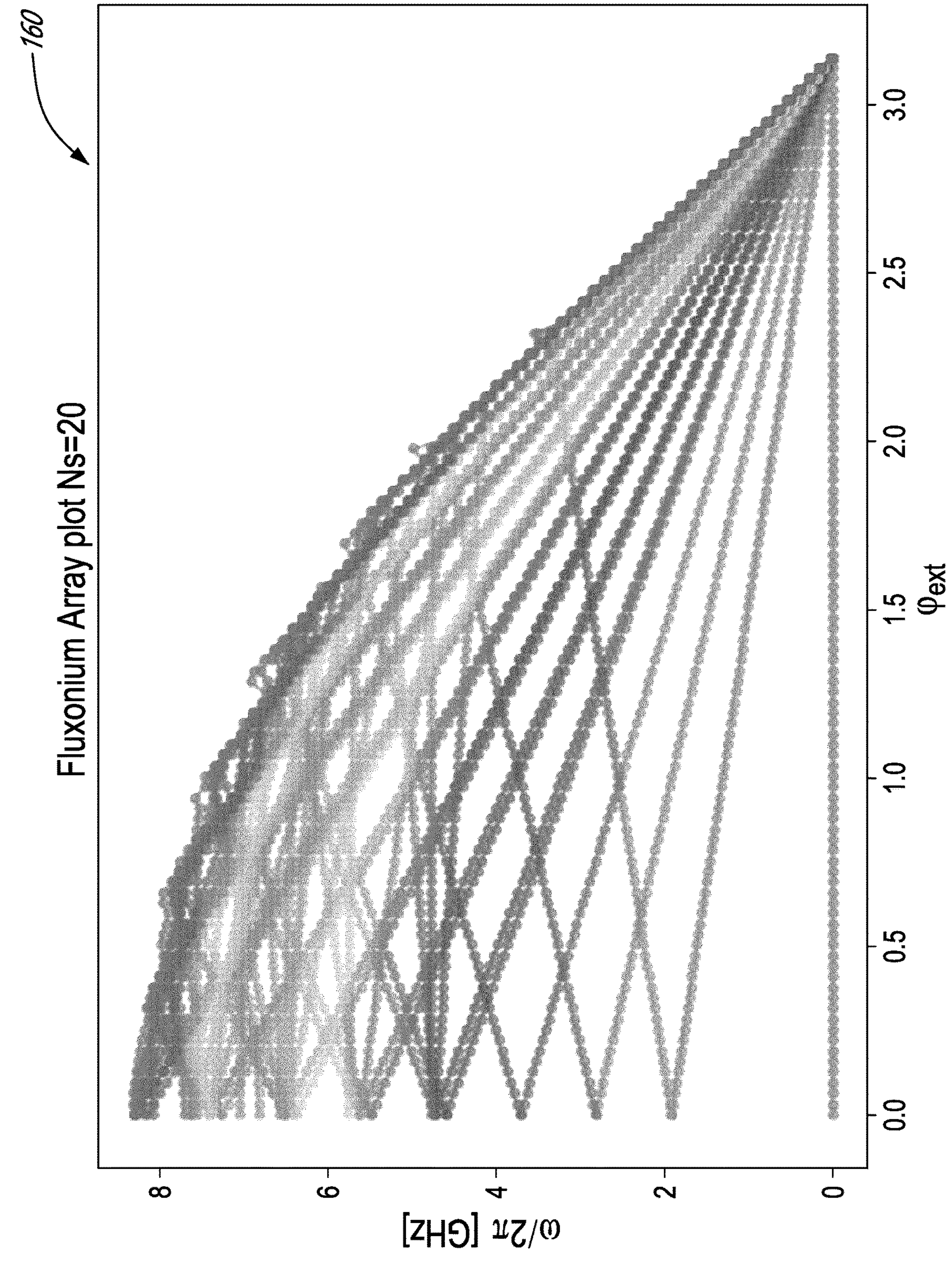

FIG. 20. Shows steps of the BLIMPS algorithm. 1) [if iteration 1, this step is skipped] form a bundled MPS 152 from the left and right MPSs appropriately normalized, 2) Use left and right environments to run multi-target DMRG 154 until convergence or for a set number of sweeps; select the lowest energy state, 3) [if multi-site unit cell] move orthogonality center 110 to left and right of two different copies of the MPS, 4) perform a polar decomposition on the last tensor to obtain a totally left- or totally right-normalized MPS, 5) Initial environment tensors are computed using an iterative relation until convergence, 6) expand the exterior bond of the two MPS systems with the 3S expansion or similar. These steps are then repeated.

Once enough sweeps are run, or a convergence criteria is reached, we generate two copies of the MPS: one where the orthogonality center has been moved to the right and the other has the orthogonality center moved to the left.

The orthogonality matrix D is then moved off the MPS completely in both the left and right cases. This is done via polar decomposition as in FIG. 17 to ensure the exterior link index basis is preserved.

For the MPS copy with the orthogonality center on the right, we contract all the left-normalized tensors onto the left environment ($L_E$) repeatedly applied (indexed by i) until a fixed point is reached, obeying the equation $$L_E|\psi_i^{(L)}\rangle = |\psi_{i+1}^{(L)}\rangle \tag{20}$$

where convergence is reached when $|\Psi_i\rangle \approx |\Psi_{i+1}\rangle$ as evaluated by the norm of the difference of those two tensors.

The same is done for the right environment ($R_E$) on the right-normalized tensors of the MPS $$R_E|\psi_i^{(R)}\rangle = |\psi_{i+1}^{(R)}\rangle \tag{21}$$

This limit is shown in diagram form in FIG. 20.

After the environments are obtained, we expand the exterior bond of each of the left- and right-normalized MPSs using the 3S expansion technique. This completes the list of steps in FIG. 20, but when we return to the first step, we can concatenate the totally left- and right-normalized MPSs together and run a multi-targeted DMRG algorithm on both. We then select the ground state after this procedure.

This algorithm can equivalently run on the bundled MPS containing many excitations if we select the requested number of low-lying excitations in the DMRG step.

i) Comparison of Infinite Algorithms

Just as VUMPS outperforms iTEBD and iDMRG, the BLIMPS algorithm has a similar performance. This is due to essentially the same steps being taken in both algorithms. Even though two MPSs are bundled together and used to sweep for the extended unit cell, the Block Lanczos routine is very efficient and does not create much overhead for an excitation index of size 2. Thus, the sweeping time is only moderately larger than regular DMRG. A major efficiency of the BLIMPS algorithm is not needing to solve for as many Lanczos routines. Instead, the multi-targeted DMRG algorithm generates the same elements required in the other algorithm but without generating each piece of the polar decompositions individually. The DMRG sweep appears to give comparable results. In all, the BLIMPS algorithm has similar convergence properties to the VUMPS algorithm, but the BLIMPS algorithm is faster due to fewer costly computational steps being included.

ii) Luttinger Liquid Properties of One-Dimensional Systems in BLIMPS

It is worth nothing here that some effects from one-dimensional physics appear in infinite calculations. Notably, when solving for the unit cell of an infinite system, the tensor network strategy relies on growing a finite size system. It is well known that Umklapp scattering in one-dimension produces a highly long-ranged $4k_F$ oscillation in a Luttinger liquid. This is in addition to the expected $2k_F$ oscillation from Fermi-Liquid theory. The interaction is so long ranged that we should not expect it to every vanish completely from the unit cell of our infinite algorithm (although tricks can be played to uniformize the resulting unit cell).

iii) Parallelization on Periodic Boundary Conditions vs. Convergence of the Infinite Method Periodic methods are notoriously difficult for MPS methods to treat. In general, all tensor network methods suffer from a problem of not knowing where to start contracting the periodic network. This is a deep problem that goes back to even the precursors to modern tensor network methods, such as the evaluation of the Ising model on a Bethe lattice. In essence, the difficulty is that one bond must be opened and held fixed while the other tensors are optimized. Then, the bond is closed, another bond is opened, and we continue until we converge.

However, convergence can be slow when the remaining tensors of the network updated in the wrong environment. The ill-behaved convergence can be especially acute for critical systems where MPS methods do not perform well anyway.

One alternative to attempting a computation on a periodic lattice to instead evaluate the unit cell of a bulk lattice. The unit cell could be seen to be periodic. The key in making this connection with the periodic systems and the infinite methods is to do this on a system that does not have serious finite size effects. Unfortunately, as already discussed, Umklapp scattering in the Luttinger liquid will cause an extremely long-ranged decay of correlation functions, so for one-dimensional systems, the limit of no finite-size effects is never truly reached, although we can get close in many cases.

A site-centric parallelization and improved infinite algorithm were introduced. In both of these instances, an excitation index was added to the matrix product state, forming a bundled MPS. In contrast to the multi-targeted DMRG algorithm where this technique was first used to calculate arbitrary excitations, the excitation index now represents excitations on the left and right of the system. Resolving which of those excitations represent the ground state can be accomplished through a Block Lanczos algorithm. Both algorithms perform well.

We also examined the scaling of the site-centric parallelized algorithm with the number of parallel threads provided on both DMRG and multi-DMRG methods. The site-centric parallelization scheme appears to suffer from no deficiencies. The only case where it should not be used is if enough cores are used that partitions of two or more lattices sites are not available on a small lattice. Thus, our recommendation is to use this algorithm in all uses of the density matrix renormalization group to ensure the algorithm has an idea speedup.

The infinite algorithm, BLIMPS, performs similarly to the best known infinite algorithms but costs fewer steps and is therefore more efficient in terms of real computational time. This algorithm is then useful whenever calculating the unit cell of an infinite system.

Since we were interested in both the parallel and infinite algorithms, we took the opportunity to examine the differences in applying a parallelized, periodic application of DMRG in contrast with computing the unit cell of a bulk system.

With infinitization, you can run a larger number of sites. If you have a really long system, same thing as being almost infinite. One starts with finding the solution for an MPS (or many combined tensors) in a finite site system, and then generate two separate MPS's from that single solution, one is left-normalized and the other one is right-normalized. From the left and right-normalized MPS's, two environments are iterated until convergence and then the two MPS's are bundled together and a multi-targeted DMRG is run. You repeat this several times (you grow the system by adding in more and more unit cells), and an infinite system can be emulated by repeating an infinite amount of times.

For an infinite system, one would need a really large amount of sites. Here one would get away with it by using only a number of sites in the unit cell as opposed to a full system, performing fewer steps. So far, algorithms have run well with open boundary conditions, however if one does not have open boundary conditions, such as if one has periodic boundary conditions, or if there is a need to calculate something in the bulk or center of a very large system, it becomes very hard to solve for tensor network. It is much easier to solve with unit cells, which can be equivalent.

III—Example Applications of the Computer-Implemented Method

A) Superconducting Circuits

An efficient tensor network toolbox can be introduced for computing the low-lying excitation of large-scale superconducting quantum circuits up to a desired accuracy. We benchmark and demonstrate the capabilities of this algorithm on the fluxonium qubit, a superconducting quantum circuit based on a junction array with over a hundred Josephson junctions. Taking into account the array degrees of freedom, we use this numerical tool to estimate the pure-dephasing coherence time of the fluxonium qubit due to charge noise and coherent quantum phase slips in a Hilbert space as large as $15^{120}$. The algorithm can be applied to the wide variety of circuit-QED systems and as a tool for scaling-up superconducting-qubit technologies.

i) Introduction

Superconducting qubits are a leading platform for quantum information processing. These qubits are built from superconducting quantum circuits integrating linear elements, such as capacitors and inductors, together with the only known nonlinear and nondissipative circuit component: the Josephson junction. These circuits operate at milliKelvin temperatures where macroscopic electromagnetic degrees of freedom associated to currents and voltages in the circuit are described quantum mechanically. In this regime, circuit nodes (or branches) are represented by bosonic fields with, in principle, infinite Hilbert-space dimension. The circuit topology defines the linear and nonlinear interactions between these bosonic modes, and finding the eigenstates of these superconducting quantum devices requires the diagonalization of the full circuit Hamiltonian. However, for circuits with more than a few nodes, this task rapidly becomes intractable by exact diagonalization. With current devices integrating 10s to 100s, 1,000s and even 10,000s of Josephson junctions, this is a real challenge that the field of circuit quantum electrodynamics is facing.

In the majority of cases, superconducting quantum devices operate in regimes where effective models with a reduced number of degrees of freedom are accurate enough to describe the physics of interest. These effective models, however, are based on approximations that allow extracting only limited information about the system. Moreover, it is often not possible to trace back the original circuit parameters from the effective model and, when it is possible, these parameters often have to be inferred indirectly from complex multivariate fits to the experimental data. This loss of information can be detrimental to circuit design.

In an example application, we adapt a tensor network method to many-body superconducting quantum circuits. We use this toolbox to compute the relevant low-energy excitations of a large-scale superconducting circuit taking into consideration all of its degrees of freedom. We show how this gives access to information about the system that can be used, for instance, to estimate its coherence times from first principles.

As an example of application of this method, we consider the fluxonium qubit. This superconducting quantum circuit is made of a small Josephson junction fabricated in parallel with an array of approximately 100 Josephson junctions and is therefore an ideal test bed for our numerical approach. To benchmark our tensor network implementation, we develop an effective model for the fluxonium qubit that captures the essential circuit details and which can easily be solved by exact diagonalization. To assert the validity of the tensor network method, we first compare results obtained from this approach to the approximate effective model in regimes where both approaches are expected to describe the device faithfully. We then push the tensor network method to regimes where deriving an accurate effective theory becomes challenging. The effective model and the tensor network toolbox are used to investigate the charge dispersion of the fluxonium qubit in a broad range of parameters, confirming an existing theory and clarifying its regime of validity. Finally, we use the tensor network method to estimate the pure-dephasing coherence times of a realistic fluxonium device. We provide direct numerical evidence of the potentially harmful effects of charge noise in this system for certain circuit parameters.

The subject-matter will be presented as follows. In section B) of this part, we first survey the tensor network method. The purpose of this section is to introduce key concepts related to this technique that are needed for the discussion of the numerical results. In section iii) of this part, we provide a tensor network implementation of the complete fluxonium-qubit Hamiltonian. More precisely, iv) is dedicated to the characterization of the many-body structure of the fluxonium circuit.

ii) The Multi-Targeted DMRG Algorithm

Tensor networks can scale far better than exact diagonalization by treating a quantum problem locally. Indeed, for a lattice of multiple sites, instead of handling the complete wavefunction of a many-body system at once, the quantum state is decomposed into a series of tensors, each representing a single site. The form of the localized wavefunction is known as a matrix product state (MPS).

The exact many-body wavefunction of the lattice can be written as $$|\psi\rangle = \sum_{\{\sigma_i\}} c_{\sigma_1\sigma_2\sigma_3 \ldots \sigma_{N_j}} |\sigma_1\sigma_2\sigma_3 \ldots \sigma_{N_j}\rangle \quad (22)$$

where $\sigma_i$ indexes orbitals (or levels) corresponding to the ith site. The amplitude $$c_{\sigma_1\sigma_2\sigma_3 \ldots \sigma_{N_j}}$$

is interpreted as a tensor with $N_J$ indices, $N_J$ being the number of sites. In order to obtain a MPS representation of $|\Psi\rangle$, a series of tensor decompositions can be performed using the singular value decomposition (SVD). The SVD decomposes a tensor into two unitary tensors, U and V, and a diagonal matrix D such that the original tensor may be reconstructed as $UDV^\dagger$. By performing successive SVDs on the full original tensor, one obtains a site-by-site representation of the wavefunction of the form $$|\psi\rangle = \sum_{\{\sigma_i\},\{a_i\}} A^{\sigma_1}_{a_1} A^{\sigma_2}_{a_1 a_2} \ldots A^{\sigma_{N_J-1}}_{a_{N_J-2}a_{N_J-1}} A^{\sigma_{N_J}}_{a_{N_J-1}} |\sigma_1\sigma_2 \ldots \sigma_N\rangle \quad (23)$$

where $$A^{\sigma_i}_{a_{i-1}a_i}$$

is the tensor of the MPS corresponding to the ith site. Here, an extra index $a_i$ appears corresponding to a link index that connects to an adjacent site. The dimension of this additional index (bond dimension) can be controlled by truncating the number of nonzero singular values that are kept in the diagonal matrix D, effectively leaving out small entries of this density matrix. For the case of short-ranged interactions and low dimensions, the physical system can be modeled efficiently by an MPS with much smaller bond dimension than the full wavefunction. Other cases can also be captured by the MPS at an increased bond dimension.

Eq (23) is represented in the left-normalized basis where the tensor A is determined from the U tensor of the SVD. The MPS can also be written with right-normalized tensors (creating tensors from $V^\dagger$). The most common gauge to choose is the mixed-canonical representation. In the mixed gauge, left- and right-normalized tensors are separated by one site where the D matrix has been contracted on to the site. This site is known as the orthogonality center, and represents, in practice, the MPS is obtained by first constructing the Hamiltonian written as a tensor network, known as matrix product operator (MPO). Once the MPO is known, an algorithm can be designed to converge a starting initial state to the correct ground state. One of the most well-known tensor network methods for this task is the density matrix renormalization group (DMRG) algorithm. In particular, DMRG is known to be very efficient for solving systems that are well captured by the MPS and can converge to the ground state in only a few iterations of the algorithm. More importantly, the complexity of this algorithm scales linearly with the number of sites, making it possible to treat systems of sizes beyond what is possible with exact diagonalization.

While DMRG is most commonly used to study the physics of ground states, the analysis of superconducting quantum circuits requires us to compute several excitations. For example, for the case of a single superconducting qubit that could be built out of a large superconducting circuit, the ground state and the two first lowest-energy excitations are needed for estimating the qubit frequency $\omega_{01}$ and anharmonicity $\omega_{12}-\omega_{01}$, where $\hbar\omega_i$ is the energy of the ith eigenstate of the circuit and $\omega_{ij}=\omega_j-\omega_i$. If $n_q$ such qubits are integrated on a chip, the number of excitations required to characterize the device typically scales as $$n_q^2.$$

The conventional approach for computing excitations with DMRG adds an energy penalty of the form $$\sum_{i\in ex.} \lambda |i\rangle\langle i|,$$

with $\lambda>0$, to the system Hamiltonian. This forces previously determined low-lying excitations above the next excited state, which becomes the ground-state of the modified Hamiltonian for which standard DMRG can be run. However, this technique can miss excited states and suffers from convergence issues.

To remedy this problem, we have derived an extension of the DMRG algorithm that includes the excitations computed directly in the Lanczos step of the algorithm. We extended the original MPS to a bundled MPS, where the orthogonality center has been given an extra index that identifies excitations in the system. By attaching the additional index to the state, we can derive an efficient tensor network update at each step of the DMRG algorithm that modifies the wavefunction until each excitation is variationally minimized to the correct eigenvalue. This procedure is numerically stable and agrees with exact diagonalization in all tested situations. This multi-targeted DMRG may overcome problems and not miss excitations nor introduce numerical degeneracies. Indeed, we have used this method to obtain tens or hundreds of excitations simultaneously.

To show an example, FIG. 21 shows sixty excitations on coupled fluxonia.

The graph 160 in FIG. 21 represents the frequency spectrum of a twenty coupled fluxonia chain including a total of sixty excitations as a function of the external flux, assumed to be the same for each fluxonium. Each color represents another excitation. This spectrum of excitations matches the expectation of fluxonium, but it also demonstrates that the multi-targeted DMRG can capture many excitations.

iii) DMRG Implementation of the Fluxonium-Qubit Hamiltonian

We choose the fluxonium qubit as a testbed for the multi-targeted DMRG approach because this circuit is described by a relatively complex device Hamiltonian that includes periodic boundary conditions as well as short- and long-range linear and nonlinear interactions. The fluxonium qubit was originally introduced as a device immune to charge noise and it has been of recent interest due to its demonstrated long coherence times and potential for quantum information processing. The fluxonium circuit (see FIG. 22) consists of a small Josephson junction 172, referred to as "black-sheep" junction, shunted by a superinductance, i.e. a circuit element with effective impedance greater than the quantum of resistance $R_Q=h/(2e)^2\simeq 6.5$ kΩ and self-resonance frequencies above 10 GHz. Superinductances can be made from Josephson junction arrays or high-kinetic-inductance superconductors, and are also crucial to other qubit designs including the noise-protected 0–π TC qubit. While a superinductance is in principle a multimode device, it can behave as a single-mode linear inductance under conditions that can be met by design. The multimode structure of such a device has, however, important consequences, some of which are investigated below.

Figure 22:
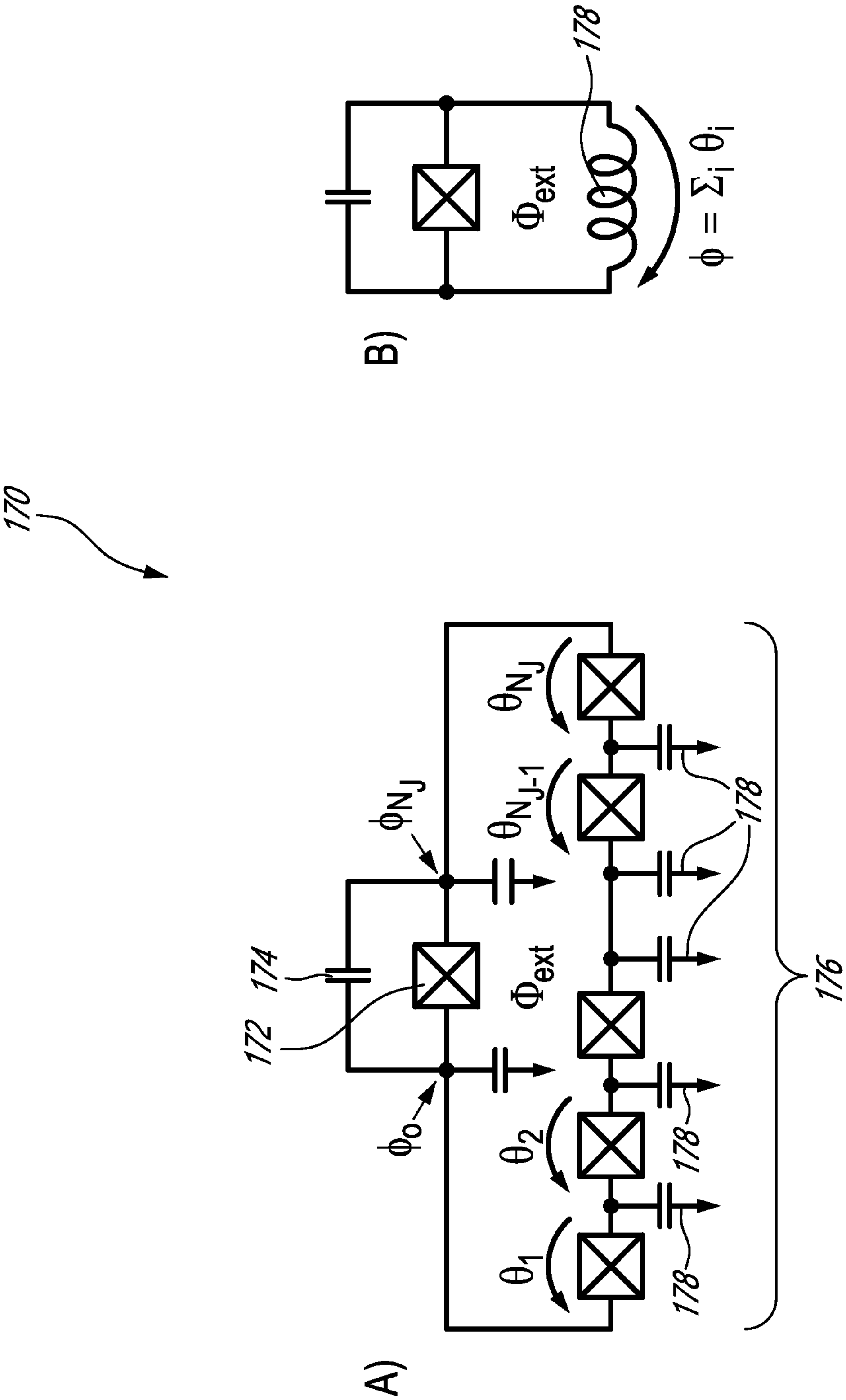
FIG. 22 is a diagram showing the lumped-element model of the fluxonium qubit.

FIG. 22 shows the lumped-element model of the fluxonium qubit. (a) Detailed circuit scheme including a "black-sheep" junction 172 (center) shunted by a capacitance 174 (top) and a junction-array superinductance with $N_J$ junctions 176 (bottom). Stray capacitances to ground 178 are depicted in a lighter shade of blue. (b) Effective circuit in which the junction-array 176 is modeled as a linear inductance 178. $\phi_i$ for $i\in[0, N_J]$ denotes the superconducting phase at every circuit node, while $\theta_i$ for $i\in[1, N_J]$ is the phase difference at every junction of the array. The superinductance (or fluxonium) mode is defined as the phase difference across the black-sheep junction 172:

$$\phi = \phi_0 - \phi_{N_J} = \sum_{i=1}^{N_J} \theta_i.$$

iv) Many-Body Structure of the Fluxonium Qubit

With the purpose of investigating the underlying many-body structure of the fluxonium qubit and understanding the effect of decoherence mechanisms in this system in greater detail, here we obtain the low-energy excitations of the full device in FIG. 22 (*a*). Let $E_{J_h}$ and $C_{J_h}$ denote, respectively, the black-sheep junction 172 energy and capacitance 174 (including a possible shunt capacitance), $L_{J_i}$ and $C_{J_i}$ be the ith array-junction 176 inductance and capacitance with respective reference values $L_J$ and $C_J$ derived from the junction plasma frequency $\omega_p=1/\sqrt{L_J C_J}$ and reduced impedance $z=\sqrt{L_J/C_J}/R_Q$, and $C_{0_i}$ be a ground capacitance associated to the ith circuit node with reference value $C_0$. Following the standard circuit-quantization procedure, we arrive at a device Hamiltonian of the form $$H = \sum_{i=1}^{N_J} H_{0i} + \sum_{j>i}^{N_J} \hbar g_{ij} q_i q_j - E_{Jb}\cos\left(\sum_{i=1}^{N_J}\theta_i + \frac{\Phi_{ext}}{\varphi_0}\right) \tag{24}$$

where $H_{0_i}=4E_{C_i}(n_i-n_{g_i})^2-E_{Ji}\cos\theta_i$ is a noninteracting (or site) Hamiltonian for the ith array junction with phase difference $\theta_i$, $E_{C_i}$ and $$E_{J_i} = \varphi_0^2 / L_{J_i}$$

(with $\varphi_0=\Phi_0/2\pi$ where $\Phi_0=h/(2e)$ is the quantum of magnetic flux) are effective charging and Josephson energies, respectively, $n_i=q_i/(2e)$ is a Cooper-pair number operator defined in terms of the conjugate charge operator $q_i$ satisfying $[q_i/2e, e^{\pm i\theta_j}]=\pm e^{\pm i\theta_i}\delta_{ij}$, and $n_{g_i}$ is an offset-charge parameter. In addition to the on-site energy terms, Eq. (24) includes a bilinear interaction $\propto q_i q_j$, which arises as a consequence of the ground, black-sheep- and array-junction capacitances of the circuit and couples the sites with comparable strength and all-to-all connectivity (see further below). Furthermore, eq. (24) includes a nonlocal interaction resulting from the strongly nonlinear Josephson potential of the black-sheep junction 172, which also varies with the external magnetic flux $\Phi_{ext.}$. The techniques identified here above in relation to equations (23) and (24) are further found in Baker et al. (Baker, Thomas E., et al. "Méthodes de calcul avec réseaux de tenseurs en physique (Basic tensor network computations in physics)." arXiv preprint arXiv: 1911.11566 (2019)). It is understood that other suitable techniques can be used without departing from the present disclosure.

In order to obtain the lowest lying excitations of Eq. (24) by means of a tensor network, the Hamiltonian must be converted to a site-by-site representation known as matrix product operator form. Notably, the long-range cosine interaction is ideally suited to matrix product states and operators, preventing an increase of the bond dimension with the number of sites. This remarkable fact is one key findings of our work, which extends to all circuit-QED Hamiltonians, from lumped-element models to black-box-quantization and energy-participation-ratio formalisms. On the other hand, the all-to-all capacitive interaction in eq. (24) does not have an efficient matrix-product-operator representation. However, this unfavorable energy term does not prevent an efficient implementation of the multi-targeted DMRG algorithm, as the results presented below have a drastically reduced bond dimension thanks to matrix-product-operator compression techniques. The efficient matrix-product-operator representation of the black-sheep Josephson potential in eq. (24) and the capacity of handling automatically an arbitrary capacitive coupling Hamiltonian by compression techniques, makes our DMRG implementation readily applicable to any other circuit quantum electrodynamics setup.

In order to assert the validity of the DMRG method, we derive an effective single-mode theory from eq. (24) that can be solved by exact diagonalization. Under approximations controlled by the parameter regime of the device, we arrive at the expression (derived further below)

$$H' = 4E_c n'^2 - N_J^2 E_L \cos(\phi'/N_J) - E_J\cos\left(\phi' + \frac{\Phi_{ext}}{\varphi_0}\right) \tag{25}$$

where $\phi'$ (with $[\phi', n']=i$) is a circuit mode closely related to the superinductance (or fluxonium) mode $$\phi = \sum_{i=1}^{N_J} \theta_i,$$

and $E_C$, $E_L$ and $E_J$ are, respectively, effective capacitive, inductive and Josephson energies obtained from the classical normal-mode structure of the circuit. In particular, if the ground capacitances $C_{0_i}$ for $i \in [1, N_J]$ can be neglected, it results that $\phi' \equiv \phi$ and $$n' \equiv n = N_J^{-1} \sum_{i=1}^{N_J} n_i,$$

where n is the conjugate charge operator to $\phi$. Otherwise, the $\phi'$ mode includes additional corrections to $\phi$ that are linear in $C_0$. Although eq. (25) reduces to the original fluxonium-qubit Hamiltonian [see FIG. 22 (*b*)] in the limit of large $N_J$, eq. (25) captures all details of the circuit's capacitance network and significant corrections to the effective energy parameters which are due to the nonlinearity of the array junctions. Technical details on the derivation of eq. (25) are provided below.

Having implemented eq. (25), we are now in a position to demonstrate the results of our DMRG approach and explore the capabilities of this method. To this end, we consider a device in the "heavy fluxonium" regime, including a large shunt capacitance and a superinductance made of $N_J=120$ identical junctions with $\omega_p/(2\pi)=25$ GHz and z=0.03. Each junction is modeled as a multilevel system using the fifteen lowest energy eigenstates of the site Hamiltonian $H_{0_i}$. We find that, for low-impedance junctions, the junction eigenbasis requires a smaller number of states in order to avoid truncation errors, compared to other possible local bases such as charge basis. The DMRG implementation is thus defined in a product basis of local wavefunctions spanning a many-body Hilbert space of size $15^{120}$, that has no built-in information about collective modes of the system. This also makes our treatment readily extensible to any other superconducting circuit.

Figure 23:
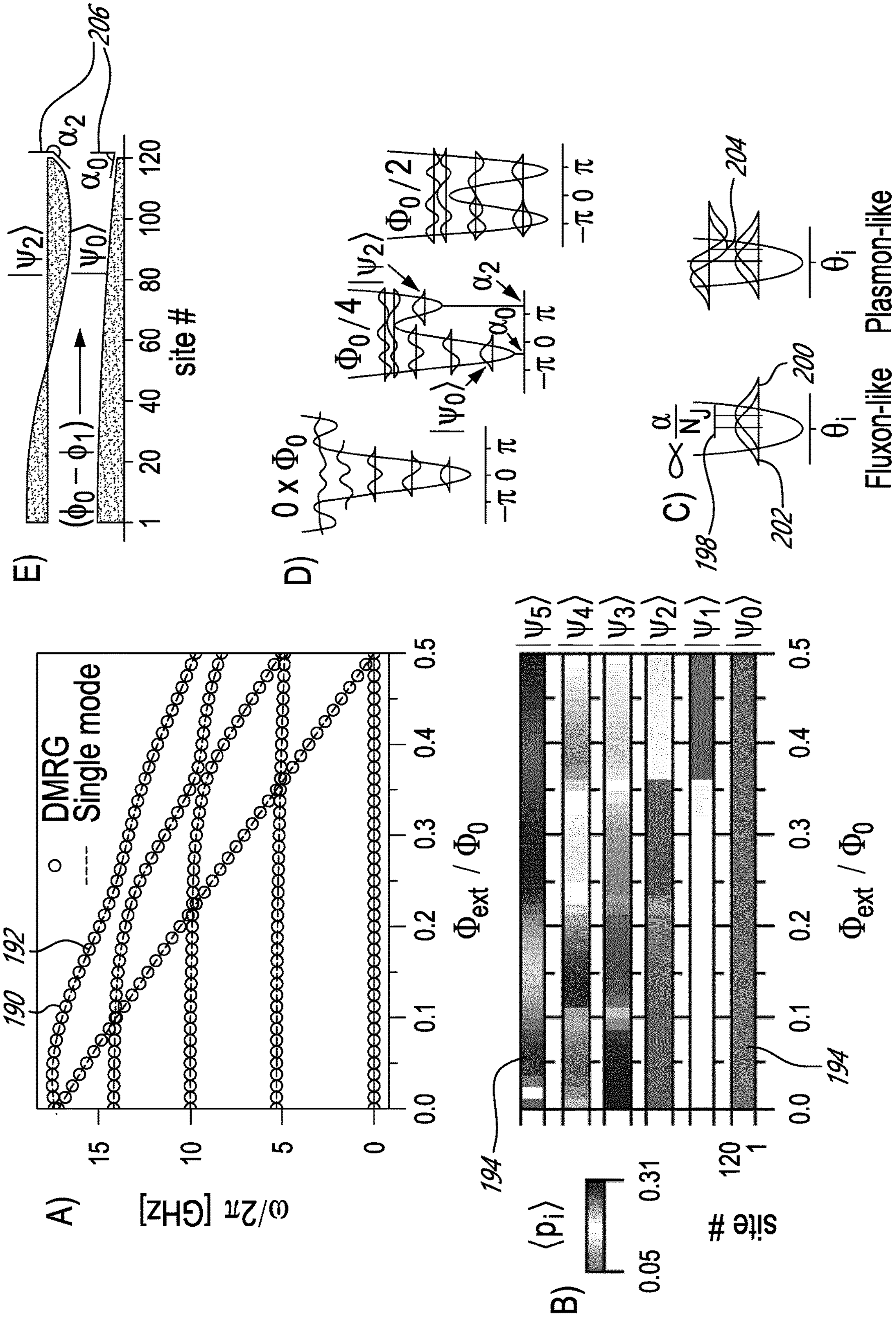
FIG. 23 is a diagram presenting A 120-junction superinductance heavy fluxonium as a function of $\Phi_{ext}$.

FIG. 23, part (a) shows the energy spectrum of the aforementioned device for both DMRG 190 (Eq. (24), light-blue circles) and exact-diagonalization 192 (Eq. (25), black dashed lines) implementations as a function of $\Phi_{ext}$. The results reveal an excellent agreement between these two independent models and provide supporting evidence of a successful DMRG implementation of eq. (24). This builds additional confidence on the DMRG method in regimes where deriving a tractable effective theory is technically challenging. Importantly, this exceptional agreement extends to all systems sizes and parameter sets that we have been able to simulate, from a few-sites fluxonium-like device to circuits with more than 200 junctions. We provide further numerical evidence for larger and smaller devices below.

Indeed, FIG. 23 presents a 120-junction superinductance heavy fluxonium as a function of $\Phi_{ext}$. (a) Energy spectrum of the Hamiltonians in eq. (24) 190 (DMRG) and eq. (25) 192 (single mode). (b) Mean photon-number population of the array Josephson junctions (sites) for every eigenstate $|\Psi_k\rangle$ of the fluxonium circuit. (c) Single-junction picture of fluxon- and plasmon-like excitations. (d) Effective potential energy and wavefunctions of the single-mode Hamiltonian for $\Phi_{ext} \in \{0, \Phi_0/4, \Phi_0/2\}$ (e) Expectation value of the phase operator at every circuit node of the superinductance for the fluxonium eigenstates labeled by $|\Psi_0\rangle$ and $|\Psi_2\rangle$. DMRG parameters: $C_{Jh}=40$ fF, $E_{Jh}/h=7.5$ GHz, $C_J \simeq 32.9$ fF and $L_j \simeq 1.23$ nH (from $\omega_p/(2\pi)=25$ GHz and z=0.03) and $C_0=0$. Single-mode model parameters: $E_c/h \simeq 0.48$ GHz, $E_L/h \simeq 1.27$ GHz (i.e., $L \simeq 129.1$ nH) and $E_j=E_{jh}$.

Figure 24:
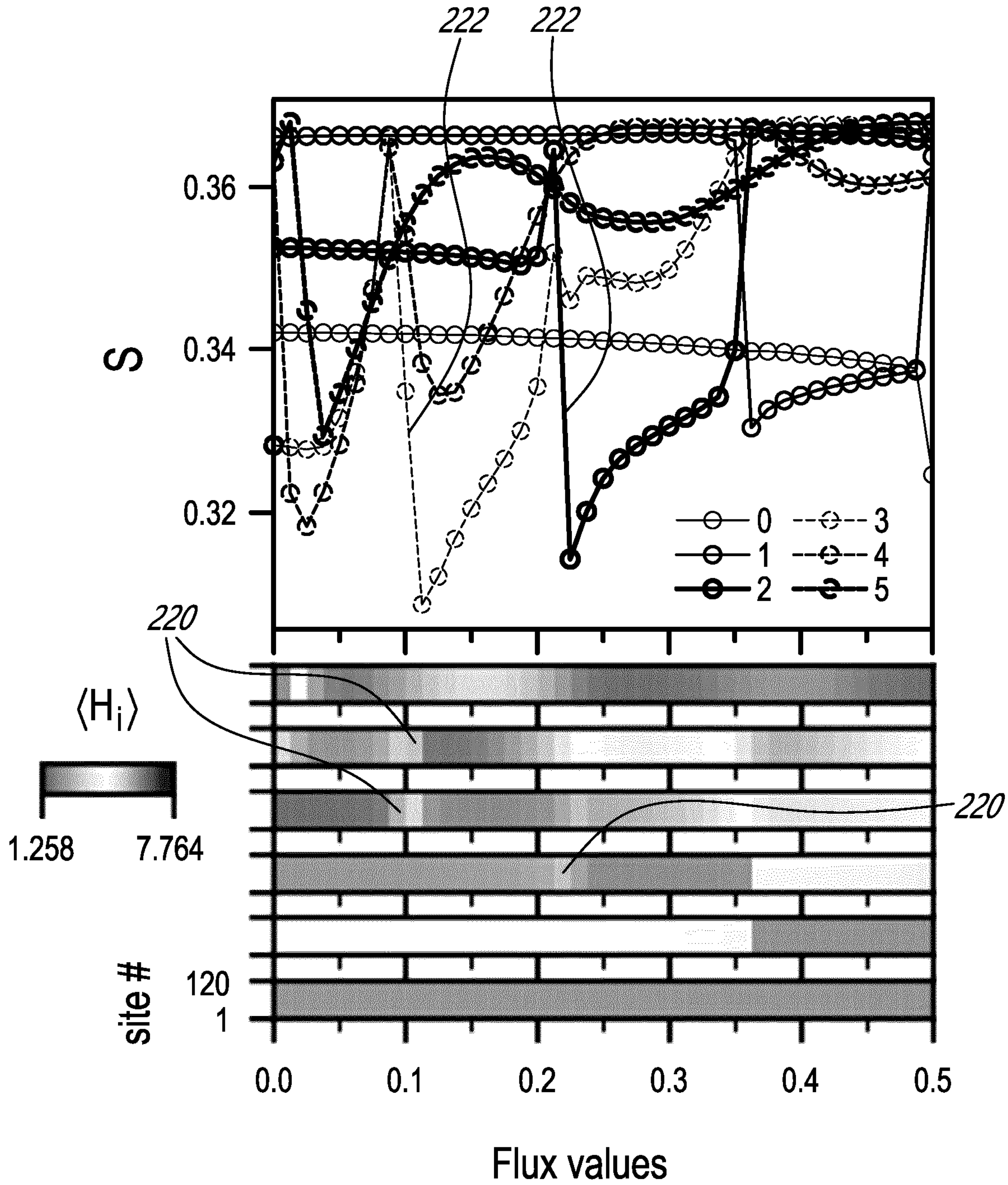
FIG. 24 is a diagram showing entanglement of each excitation as tuned through different flux values (x-axis) between 0 and ½ a flux quanta.

FIG. 24 shows the same as in FIG. 23, but with the entanglement. Jumps 222 in the entanglement correspond to transitions between fluxon and plasmon like states.

Indeed, FIG. 24 shows entanglement of each excitation as tuned through different flux values (x-axis) between 0 and ½ a flux quanta. When compared with the evaluation of the expectation values of the local terms of a fluxonium (lower bar graphs; normalized photon number), the transitions 220 between regimes of low photon number and high photon number coincide with the jumps 222 in entanglement. This indicates that the transition between fluxon-like and plasmon-like regimes can be identified through the entanglement, which is easily obtained from a tensor network method such as the multi-targeted DMRG.

With the purpose of showcasing the capabilities of the multi-targeted DMRG algorithm, we now explore the expectation values of some site operators that are useful to understand the many-body structure of the device. FIG. 23, part (b) shows the mean photon-number population $\rangle p_i \langle = \langle \Psi_k | H_{0i} | \Psi_k \rangle / (\hbar\omega_p)$ of the ith site, for all sites ($i \in [1, N_J]$, vertical axis) as a function of $\Phi_{ext}$. These expectation values are computed for a given eigenstate $|\Psi_k\rangle$ of the full fluxonium circuit, from the groundstate (k=0, bottom density plot 194) to the 5th excited state (k=5, top density plot 196). The result is constant as a function of site number due to the absence of circuit-element disorder in our simulation. We observe that flux-sensitive (fluxon) transitions have the lowest values of photon population, while the flux-insensitive (plasmon) transitions involve nonzero population of the sites' excited states.

We interpret FIG. 23 part (b) with the help of FIG. 23 part (c), which illustrates a portion of the local Josephson potential of an array junction and its single-particle wavefunctions. From the point of view of this site (left panel), a fluxon state $|\Psi_k\rangle$ at $\Phi_{ext} \neq 0, \Phi_0/2$ involves a small displacement 198 $\alpha_k/N_J$ of the site's wavefunction 200 (red) away from its noninteracting groundstate position 202 (pink), indicating the existence of a circulating current. Collectively, these displacements add to a mean value $\langle \Psi_k | \phi | \Psi_k \rangle \equiv \alpha_k$, which corresponds to a local minimum of the effective fluxonium potential. A similar mean-field displacement 204 is found for the plasmon states (right panel), although these involve important contributions from the site's excited states.

The above interpretation becomes clearer by considering the effective potential and wavefunctions of the fluxonium circuit, shown in FIG. 23 part (d) for $\Phi_{ext} \in \{0, \Phi_0/4, \Phi_0/2\}$, as predicted by the single-mode Hamiltonian eq. (25). The shape of the effective potential is determined by the cosine potential of the black-sheep junction and the inductive energy $$-N_J^2 E_L \cos(\phi'/N_J) \simeq E_L \phi'^2 / 2$$

from the junction array. While fluxon states are the lowest energy eigenstates associated to the local minima of this effective potential and shift significantly with $\Phi_{ext}$, plasmon states correspond to intra-well excitations and have a very weak flux sensitivity. For some flux biases, these two types of excitations can hybridize, leading to the multiple anti-crossings of the spectrum of FIG. 23 part (a).

FIG. 23 part (e) combines insights form both part (c) and part (d) and shows the expectation value of the phase difference $$\phi_0 - \phi_i = \sum_{j=1}^{i} \theta_j$$

from DMRG as a function of the site number and for the fluxon states $|\Psi_0\rangle$ and $|\Psi_2\rangle$ at $\Phi_{ext}=\Phi_0/4$. The expectation value $\langle \phi_0-\phi_i\rangle$ is indicated by the angle sustained by a small vector with the vertical direction. The angle 206 between the last of such vectors (from left to right) is in perfect agreement with the positions of the local minima $\alpha_0$ and $\alpha_2$ of the effective potential, as predicted by eq. (25) [see part (d), middle panel at $\Phi_{ext}=\Phi_0/4$].

Having access to the expectation values of local and, in general, n-body operators makes it possible to investigate certain aspects of the many-body properties of superconducting circuits. This unprecedented level of knowledge could motivate, for instance, new ways of encoding quantum information nonlocally in protected subspaces by exploiting many-body entanglement in these systems. Moreover, metrics like those of FIG. 23 part (b) contain information about the energy-participation ratio of all circuit components for a given collective excitation. This knowledge may be used to identify dominant dissipation channels or evaluate the effect of circuit-element disorder.

v) Conclusions and Outlook

In conclusion, we have developed a multi-targeted DMRG algorithm for simulating large-scale superconducting quantum devices, and we have applied this numerical technique to the case of the fluxonium qubit. We have moreover developed a detailed single-mode theory for this qubit, which has been used to assert the validity of the DMRG simulations and to interpret the results.

The methods developed for superconducting circuits have the potential to enable advancements in several areas of superconducting-qubit research. In particular, we envision future applications to the analysis of multiqubit devices and the exploration of condensed-matter aspects of large-scale superconducting quantum devices. Furthermore, our multi-targeted DMRG technique may result of significant value for designing scalable superconducting-qubit architectures and developing a deeper understanding of the effects of dissipation and circuit-element disorder in such devices.

B) Topological States of Matter

The most widely adopted use of tensor networks for predicting real materials is the search for topological states of matter. A tensor network is ideally suited to finding topological states since the computation of entanglement can be easily extracted from a tensor network. Most notably, a Kagome spin lattice has been identified as one of two types of spin liquids with tensor networks. In the cases of identifying topological order, it is important to calculate systems of large sizes, but doing so to a sufficient accuracy is time consuming and difficult. The techniques discussed in this document are a significant improvement over the existing approaches, notably the parallelization and infinite algorithms. We are currently exploring their use in lattice models that exhibit topological order. We have found an ideal speedup with the parallelization routine and we know that the VUMPS algorithm for infinite systems is superior to the others in the literature. However, our BLIMPS algorithm has significantly fewer computational steps while achieving comparable convergence. We will apply both of these methods to attempt to solve systems within current reach faster, and we also wish to explore how large of a system we can compute. Current capabilities can only reasonably cover lattices on a cylinder of width 10 sites. We believe these methods can extend beyond that and potentially to previously unreachable lattice models and those with more complicated connectivity.

One of the possible applications of topological states of matter is the construction of a self-correcting code for a quantum computer. So, this tool may help us one day achieve a physically realistic quantum computer. This would help us develop quantum computers in the future, while the previously mentioned superconducting qubits can be used for a quantum computer now.

C) N-Point Correlations

Estimating correlations is essential to physical properties of various systems in a broad sense. The form that these correlations take is $\langle \Psi|f(\mathcal{O}_1(t), \mathcal{O}'_2(t'), \ldots, \mathcal{O}''_N(t''))\rangle$ for some number N of operators defined very broadly over all operators where $f$ is the combination of operators. Each of these operators can be applied at different times. One would do this following the traditional method of time-evolving a MPS and then applying the operators at the appropriate times. Here, this same set of operations can be extended to the bundled MPS where multiple excitations are estimated simultaneously when applying operators and time evolving.

This class of correlations are one of the fundamental quantities of a system that can be computed: named the Green's function $\mathcal{G}$. If the Green's function of a system is determined, then the properties of the quantum wavefunction can be determined and all other observable quantities of a system. In order to construct a reliable Green's function, the excitations of a system should be determined. The multi-targeted DMRG approach should in principle be useful in constructing a Green's function since it finds many excitations reliably. One direct way of find the Green's function is to construct the continued fraction representation, $$\mathcal{G}(\omega) = \cfrac{\langle 0|\hat{A}^\dagger\hat{A}|0\rangle}{\omega - \alpha_0 - \cfrac{\beta_1^2}{\omega - \alpha_1 - \cfrac{\beta_2^2}{\omega - \ldots}}} \tag{26}$$

for a frequency $\omega$ and using the $\alpha$ and $\beta$ coefficients of a Lanczos routine from the recursion relation, $$|\psi_{p+1}\rangle = \mathcal{H}|\psi_p\rangle - \alpha_p|\psi_p\rangle - \beta_p^2|\psi_{p-1}\rangle \tag{27}$$

where $\alpha_p=\langle \Psi_p|\mathcal{H}|\Psi_p\rangle/\langle \Psi_p/\Psi_p\rangle$ and $$\beta_p^2 = \langle\psi_{p-1}|\psi_{p-1}\rangle.$$

Since the $\alpha_p$ coefficients are the excitation energies, the Green's function is largely influenced by the accuracy of the excitation energies. Note that $\hat{A}^{554}\hat{A}$ could be replaced by any two operators (e.g., $S^+S^-$ for the spin-structure factor, etc.).

We expect that the quality of the α and β coefficients to be much higher if they are evaluated from a bundled MPS. The reason for this is that the regular MPS may only produce results suitable near critical points. The crux of the algorithm is that the MPS is solved for the ground state and then each time we contract the tensor network down to a plurality of sites, we can run Lanczos many times to get many excitations. However, we believe that by using more excitations in the bundled MPS that the procedure here can give more accurate coefficients.

If the Green's function is successfully determined, this may provide a novel route to time dependent properties of a system. That strategy would have widespread application from topological materials to others that we discuss next.

D) Quantum Chemistry Systems

One desired application in condensed matter physics in general is the simulation of materials with computational methods. This is a very hard problem as the electron-electron interaction has proven to be difficult to treat in a systematic and reliable way for many electrons. Tensor network methods rely on a locality hypothesis where the correlations of the system are local, and while they can be applied to quantum chemical systems, the usefulness of the solutions are constrained by computational power. The parallelization and infinite algorithms used here might be able to extend the usefulness of DMRG in these systems somewhat. However, the most useful quantities for the quantum system would be to obtain more information from the DMRG solution than can be found from the ground-state only. Using the multi-targeted methods, more excitations can be found and these can be useful in determining, for example, vibrational modes in a molecule. We also expect that the time dependent case will be of high interest once the Green's function is determined.

E) Simulation of Spectroscopic Methods

Spectroscopic methods of analyzing a materials properties rely on computing the time dynamics of a particular system. One possible way to do this is the resonant inelastic x-ray scattering (RIXS) method. The RIXS method has been treated with DMRG using single-frequency techniques, but these methods only give a limited amount of information about the full system and are best applied to small systems due to computational cost. With the techniques of this paper, we can compute the time dependent properties at any frequency from the same computation and obtain more information in less time. This has potential lasting value in the spectroscopic world to revolutionize how these systems are modeled.

While the RIXS method has been treated with DMRG using single-frequency techniques, it is conceivable to apply this method to other spectroscopic techniques, but more work is necessary in formalizing these methods before extending to other uses.

F) Methods of Finding Arbitrary Excitations

One way to extend the solution of the ground state properties to other cases is to compute the bundle of excitations on a non-sequential grid of energies. After having found the ground state solution with multi-targeted DMRG, this is possible with a known method called the shift-inverse. This method bears a close resemblance to the single-frequency methods mentioned in Section. 5 part (III). In this method, the ground state is first solved as in the multi-targeted DMRG algorithm on the bundled MPS.

After this, a new state φ must be optimized to minimize the cost function $$\min \| \mathcal{O} |\varphi\rangle - |\Psi\rangle \|^2 \tag{28}$$

where Ψ is the bundled MPS and $\mathcal{O}$ is $\mathcal{H}-\lambda$ for some targeted eigenvalue λ. The optimization scheme used for temperature dependent systems can be used to then minimize the cost function. The algorithm here is essentially DMRG but with the operator $\mathcal{O}$ instead. This procedure is a DMRG like procedure with the MPO replaced by the operator $\mathcal{O}$. For the multi-targeted DMRG, we must target several λ values at the same time. The Hamiltonian term in the operator is treated the same way between the regular and bundled MPS techniques. However, the λ term must be extended to a matrix, Λ. At each step in sweeping the lattice, we can apply Λ 210 as in FIG. 25 in order to apply each different λ value to each excitation individually. This allows us to find converge to the bundled MPS representing eigenvalues closest to the chosen λs.

Figure 25:
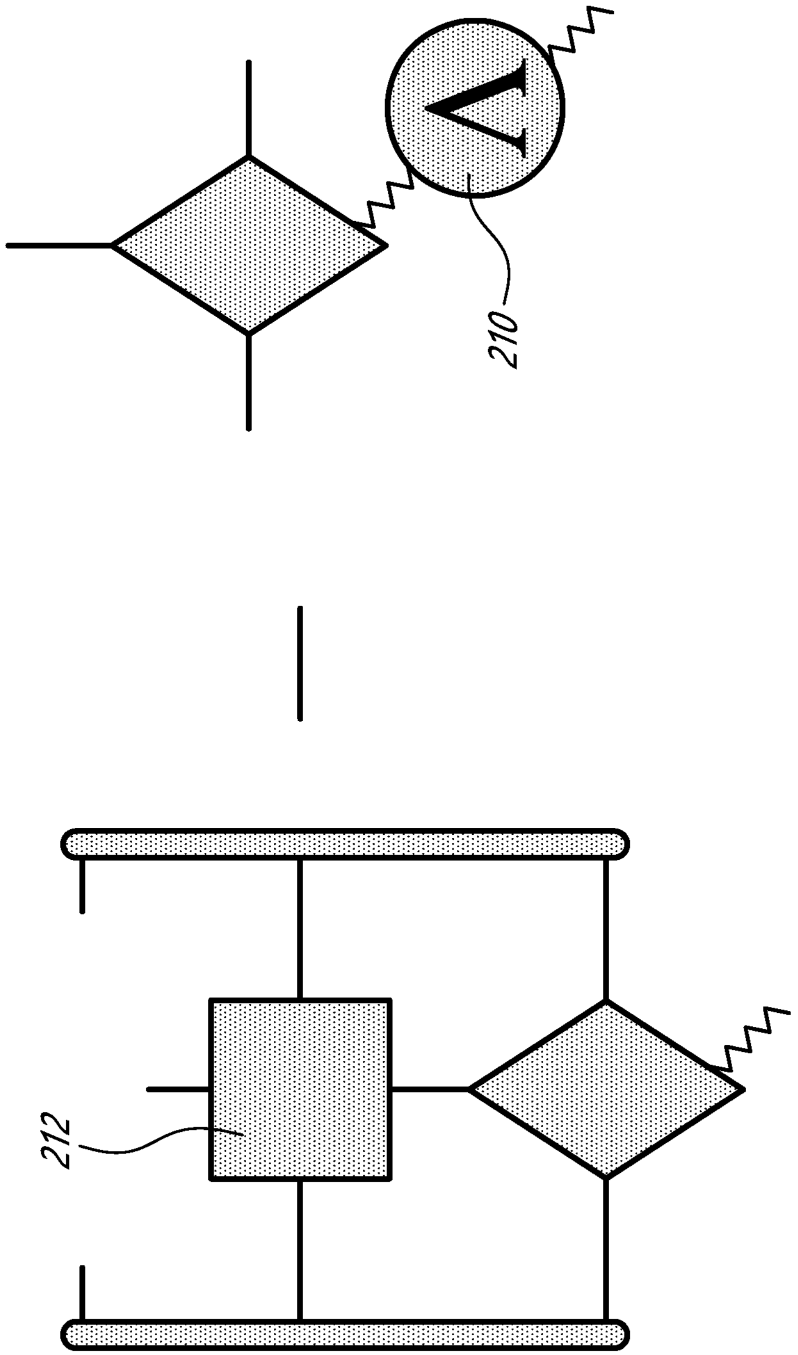
FIG. 25 is a diagram showing an application of the operator for the shift-inverse technique on the bundled MPS.
Figure 26:
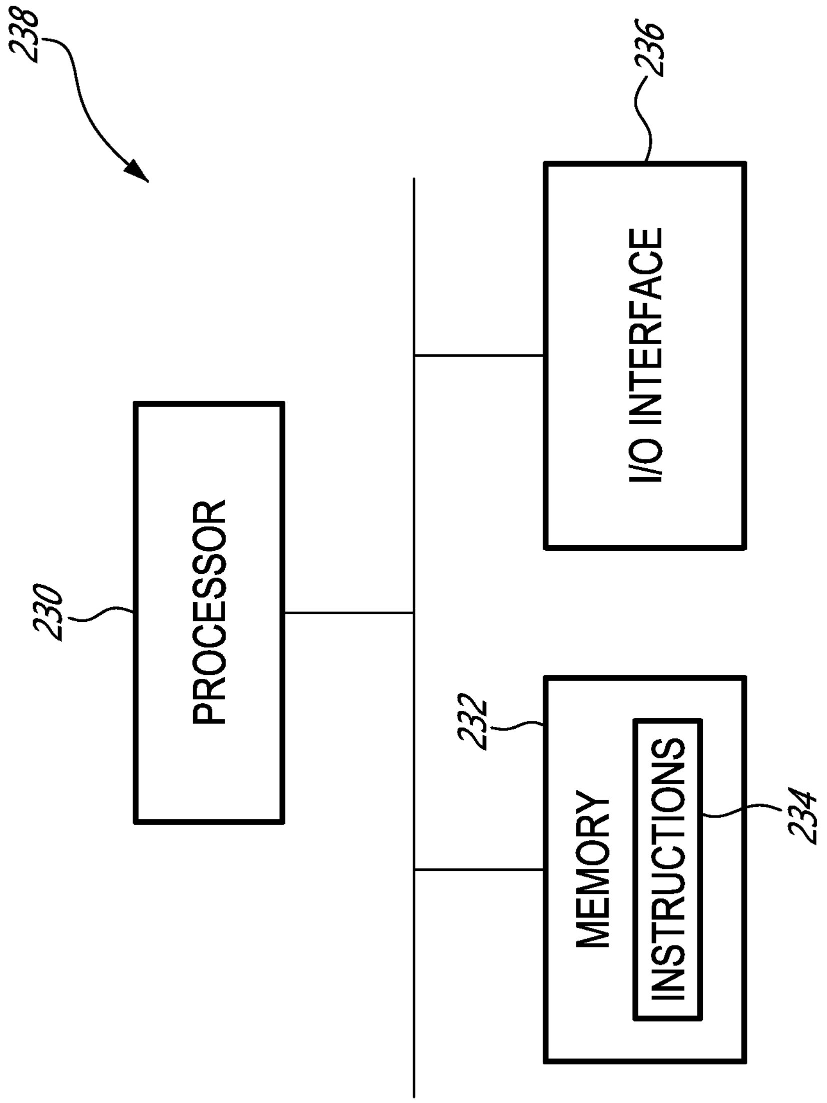
FIG. 26 illustrates an exemplary computer and some of its components.

FIG. 25 shows an application of the operator for the shift-inverse technique on the bundled MPS as noted in the text. The Λ matrix 210 is applied to the excitation index. The square tensor 212 (rank-4) is a MPO tensor for the case of the shift-inverse.

Alternative approaches can be preferable in alternate embodiments.

G) Solution of Impurity Models

Our interest in finding the Green's function is to ultimately use this algorithm as a cluster solver in dynamical mean-field theory (DMFT). It has been proposed for some time now that a tensor network would be able to handle the impurity model of DMFT with larger numbers of sites. Existing methods to treat the impurity problem with DMRG often fail to find the time-dependent dynamics with a sufficient accuracy for application to real systems, which is not possible with the current progress with these methods. We therefore believe that pursuing the DMFT cluster solver with this new method of determining excitations and finding coefficients for the continued fraction representation of the Green's function will offer a compelling alternative to the currently used techniques and possibly allow for computation of real systems.

H) Optimizing the Matrix Product State without Moving the Orthogonality Center

When Schrodinger's equation is not given in an orthonormal basis, we must solve a generalized eigenvalue equation, $$\mathcal{H}\Psi = ES\Psi \tag{28}$$

for an overlap matrix with elements $S_{k\ell} = \langle \varphi_k | \varphi_\ell \rangle$ for some non-orthogonal basis vectors φ.

When a MPS is gauged to the orthogonality center, and the tensor network is contracted to a plurality of tensors include the orthogonality center, the overlap matrix for this the identity (unless other considerations such as solving a quantum chemistry problem in a non-orthogonal basis is taken) for general use cases of DMRG. However, if we contract the tensor network to a plurality of tensors that that do not include the orthogonality center, the overlap matrix must be taken in to account.

Minimizing the non-orthogonality center tensor can in principle be done by using a conjugate gradient technique. However, since the eigenvalue problem is now of a special type, the problem is phrased in a different way mathematically than the normal use case of DMRG. The manifold most useful to minimize over may be the Stiefold manifold. Using the conjugate gradient method on the Stiefold manifold can converge the ground state and this method will be improved to make it so that we can compete with regular implemetations of DMRG.

Note two advantages of this optimization. One is that the orthogonality center does not need to be moved. The second is that if the effective bond dimension of the MPS is larger in one part of the system, then moving the orthogonality center may unnecessarily increase the size of the tensors in the part of the system where the tensors are smaller. Optimizing the smaller tensors is always more efficient if the number of steps to do so is low. With this technique, we do not move the orthogonality center and therefore do not increase the bond dimension of the MPS unnecessarily away from the region where the bond dimension is large. This could potentially have a strong application to impurity models (i.e., a Hubbard model with an interaction on only one site) where the impurity site generally requires larger tensors and allow us to optimize the remaining tensors while keeping them small.

As can be understood, the examples described above and illustrated are intended to be exemplary only. The scope is indicated by the appended claims.

What is claimed is:

1. A computer implemented method of solving a Hamiltonian, the method comprising:

performing, in a tensor network having tensors, and a first combination of contracted ones of the tensors, a Lanczos method acting on uncontracted ones of the tensors, the Lanczos method including evaluating a recursive relation, forming a block tridiagonal matrix having a block size greater than a block size of one, based on the recursive relation, and diagnonalizing the block tridiagonal matrix to obtain new tensors and energy levels of the tensor network and thereby solving for the contracted tensors of the tensor network, wherein at least one of the uncontracted ones of the tensors has an index for the group of excitations;

repeating said performing with one or more other combinations of contracted ones of the tensors, thereby solving for the other ones of the tensors, and yielding an energy level solution of the Hamiltonian; and outputting the energy level solution.

2. The method of claim 1 further comprising storing the energy levels in a computer-readable memory of the non-transitory type.

3. The method of claim 1 further comprising transmitting the energy levels via an input/output interface.

4. The method of claim 1 wherein the energy level solution is an approximation within a predetermined tolerance.

5. The method of claim 1 further comprising converting the Hamiltonian into a matrix product operator (MPO), the tensors as bundled matrix product state (MPS), and contracting the plurality of tensors.

6. The method of claim 5 further comprising iterating over j including, subsequently to said Lanczos method, moving an orthogonality center as i is incremented recontracting the tensor network, and repeating the Lanczos method until at least one of i) a predetermined number of iterations are performed or ii) an energy level variance between iterations is considered to be within a predetermined tolerance.

7. The method of claim 6 wherein said recontracting the tensor network includes partially updating the tensors.

8. The method of claim 5 performed on a single site basis, wherein each iteration includes adding a noise term $\alpha$ to a $H\Psi$ term.

9. The method of claim 1 wherein the tensor network has at least 5 sites.

10. The method of claim 9 wherein the number of excitations is above 10.

11. The method of claim 9, wherein the tensor network has at least 20 sites.

12. The method of claim 9, wherein the tensor network has at least 50 sites.

13. The method of claim 10, wherein the number of excitations is above 100.

14. The method of claim 10, wherein the number of excitations is above 1000.

15. A computer program product comprising computer-executable instructions stored in a computer readable memory of the non-transitory type which can be read by a computer and executed to perform the method of claim 1.

16. A computer-implemented method of solving a Hamiltonian, the method comprising-:

forming an equation of the form $f(\Psi_{p+1}, B_{p+1})=L(H, \Psi_p, \Psi_{p-1}, \ldots, \Psi_1, \Psi_0, B_p, B_{p-1}, \ldots, B_1)$, where $B_{p+1}$ is a matrix that results from a decomposition of the result of L and where $p \in \{0, \ldots, n\}$, on the basis of a tensor network having a plurality of contracted tensors, and at least one non-contracted tensor j, non-contracted tensor j having an additional index covering a plurality of excitations, including obtaining $\Psi_0$, from a decomposition of non-contracted tensor j, and $A_p$ in the form of a matrix according to $A_p=(\Psi_p|H|\Psi_p)/(\Psi_p|\Psi_p)$;

evaluating a recursive relation for $\{A_p\}$ and $\{B_p\}$ including using the equation at least two times;

using $\{A_p\}$ and $\{B_p\}$ to form a block tridiagonal matrix;

diagonalizing the block tridiagonal matrix to obtain new tensors and energy levels of the tensor network;

solving other tensors of the tensor network, thereby yielding an energy level solution of the Hamiltonian; and outputting the energy level solution.

17. The computer-implemented method of claim 16 comprising a plurality of non-contracted tensors, including the non-contracted tensor j, the plurality of non-contracted tensors sharing indices.

18. The computer-implemented method of claim 16 wherein the block tridiagonal matrix is in the form $$\breve{M} = \begin{pmatrix} A_0 & B_1^\dagger & 0 & \ldots & 0 \\ B_1 & A_1 & B_2^\dagger & \ldots & 0 \\ 0 & B_2 & A_2 & \ddots & \vdots \\ \vdots & \vdots & \ddots & \ddots & B_n^\dagger \\ 0 & 0 & \ldots & B_n & A_n \end{pmatrix},$$

wherein n−1 is equal to a number of the at least two times the equation is used during said evaluating the recursive relation.

19. A computer program product comprising computer-executable instructions stored in a computer readable memory of the non-transitory type which can be read by a computer and executed to perform the method of claim 14.

20. A computer-implemented method of solving a Hamiltonian, the method comprising:

forming an equation of the form $\Psi_{p+1}B_{p+1}=H\Psi_p-\Psi_pA_p-\Psi_{p-1}B_p$, where $B_{p+1}$, is a matrix that results from a decomposition of the result of l, and where $p \in \{\mathbf{0}, \ldots, n\}$, on the basis of a tensor network having a plurality of contracted tensors, and at least one non-contracted tensor j, tensor j having an additional index covering a plurality of excitations, including obtaining $\Psi_0$ from a decomposition of tensor j, and $A_p$ in the form of a matrix according to $A_p=(\Psi_p|H|\Psi_p)/(\Psi_p|\Psi_p)$;

evaluating a recursive relation for $\{A_p\}$ and $\{B_p\}$ including using the equation at least two times; using $\{A_p\}$ and $\{B_p\}$ to form a block tridiagonal matrix; diagonalizing the block tridiagonal matrix to obtain new tensors and energy levels of the tensor network;

solving other tensors of the tensor network, thereby yielding an energy level solution of the Hamiltonian; and outputting the energy level solution.

* * * * *